US012367820B2

(12) United States Patent
Yu et al.

(10) Patent No.: US 12,367,820 B2

(45) Date of Patent: Jul. 22, 2025

(54) PANEL DRIVING DEVICE AND PANEL DRIVING METHOD

(71) Applicant: AUO Corporation, Hsin-Chu (TW)

(72) Inventors: Chi Yu, Hsin-Chu (TW); Kai-Hsiang Liu, Hsin-Chu (TW)

(73) Assignee: AUO CORPORATION, Hsin-Chu (TW)

( * ) Notice: Subject to any disclaimer, the term of this patent is extended or adjusted under 35 U.S.C. 154(b) by 0 days.

(21) Appl. No.: 18/794,706

(22) Filed: Aug. 5, 2024

(65) Prior Publication Data

US 2025/0054438 A1 Feb. 13, 2025

(30) Foreign Application Priority Data

Aug. 8, 2023 (TW) ................................ 112129829

(51) Int. Cl.

*G09G 3/32* (2016.01)
*G09G 3/3233* (2016.01)
*G09G 3/3266* (2016.01)

(52) U.S. Cl.

CPC ............. *G09G 3/32* (2013.01); *G09G 3/3233* (2013.01); *G09G 3/3266* (2013.01); *G09G 2300/0842* (2013.01); *G09G 2300/0861* (2013.01); *G09G 2310/0243* (2013.01); *G09G 2310/08* (2013.01); *G09G 2320/0233* (2013.01)

(58) Field of Classification Search

CPC ...... G09G 3/32; G09G 3/3233; G09G 3/3266; G09G 2300/0842; G09G 2300/0861; G09G 2310/0243; G09G 2310/08; G09G 2320/0233

USPC ........................................................ 345/691

See application file for complete search history.

(56) References Cited

U.S. PATENT DOCUMENTS 8,031,162 B2 * 10/2011 Kuroki .................. G09G 3/342
345/204
2015/0002377 A1 1/2015 Liu
2020/0082768 A1 * 3/2020 Oh ....................... G09G 3/3291
2021/0349599 A1 * 11/2021 Chen ................... G06F 3/04166
2022/0343848 A1 * 10/2022 Jeon ..................... G09G 3/3233
2023/0122051 A1 * 4/2023 Yang .................... G09G 3/3241
345/206
2024/0290260 A1 * 8/2024 Shang .................. G09G 3/3225

FOREIGN PATENT DOCUMENTS

CN 110599941 A 12/2019
TW 201942894 A1 11/2019

* cited by examiner

*Primary Examiner* — Tom V Sheng
(74) *Attorney, Agent, or Firm* — WPAT, PC

(57) ABSTRACT

A panel driving device includes a processor. In a first frame, an initial scan signal has an initial scan pulse signal. In a second frame, the initial scan signal has the initial scan pulse signal, and the second frame is located after the first frame. In the second frame, the processor shifts an initial light emitting pulse signal of an initial light emitting signal by the first period and an offset period, and a pulse period of the initial light emitting pulse signal does not overlap a pulse period of the initial scan pulse signal, and the offset period is associated with a frame number.

20 Claims, 16 Drawing Sheets

PANEL DRIVING DEVICE AND PANEL DRIVING METHOD

CROSS-REFERENCE TO RELATED APPLICATION

This application claims priority to Taiwan Application Serial Number 112129829, filed Aug. 8, 2023, which is herein incorporated by reference in its entirety.

BACKGROUND

Field of Invention

The present invention relates to a driving device and a driving method. More particularly, the present invention relates to a panel driving device and a panel driving method.

Description of Related Art

At present, multi-emission is often conducted in a frame for driving of the panel, to solve the problems of panel flashing and camera shooting field.

However, the driving method as mentioned above causes the problem of horizontal bright line. This is mainly originated from that the time-sequence controller has the problem of frequency switching of between frames to cause the start time of the emission signals of some horizontal lines to be longer or shorter.

Over a long time, influences gradually accumulate on the human eyes such that the problem of light and dark lines of the multiple horizontal lines mentioned above is recognized.

SUMMARY

This summary is intended to provide a simplified summary of the disclosure to provide the reader with a basic understanding of the disclosure. This summary is not an extensive overview of the disclosure, and it is not intended to identify key/critical elements of the embodiments or to delineate the scope of the disclosure.

A technical aspect of the present disclosure is related to a plane driving device. A panel driving device includes a processor. The processor is configured to generate an initial scan signal, an initial light emitting signal, and a clock signal according to an initial signal. The initial scan signal has an initial scan pulse signal in a first frame. The initial scan signal has the initial scan pulse signal in a second frame, and the second frame is located after the first frame. The initial light emitting signal has an initial light emitting pulse signal in the first frame, and a pulse period of the initial light emitting pulse signal does not overlap a pulse period of the initial scan pulse signal. The processor shifts the initial light emitting pulse by an offset time to form a first light emitting pulse signal in the second frame, a pulse period of the first light emitting pulse does not overlap the pulse period of the initial scan signal, and the offset time is associated with a frame number.

A technical aspect of the present disclosure is related to a panel driving method. The panel driving method includes the following steps of: generating, by a processor, an initial scan signal, an initial light emitting signal, and a clock signal, in which the initial scan signal has an initial scan pulse signal in a first frame, the initial scan signal has the initial scan pulse signal in a second frame, the second frame is located after the first frame, the initial light emitting signal has an initial light emitting pulse signal in the first frame, and a pulse period of the initial light emitting pulse signal does not overlap a pulse period of the initial scan pulse signal; and shifting, by the processor, the initial light emitting pulse signal of the initial light emitting signal by an offset time, to form a first light emitting pulse signal, in which a pulse period of the first light emitting pulse signal does not overlap a pulse period of the initial scan pulse signal, and the offset time is associated with the frame number.

Therefore, in accordance with the technical content of the present disclosure, the effect of panel brightness uniformization can be achieved in the panel driving device as illustrated by the embodiments of the present disclosure by adjustments between the scan signals.

After referring to the following embodiments, a person with ordinary knowledge in the technical field to which this case belongs can easily understand the basic spirit and other invention purposes of this case, as well as the technical means and implementation forms adopted in this case.

BRIEF DESCRIPTION OF THE DRAWINGS

The disclosure can be more fully understood by reading the following detailed description of the embodiment, with reference made to the accompanying drawings as follows.

Figure 1:
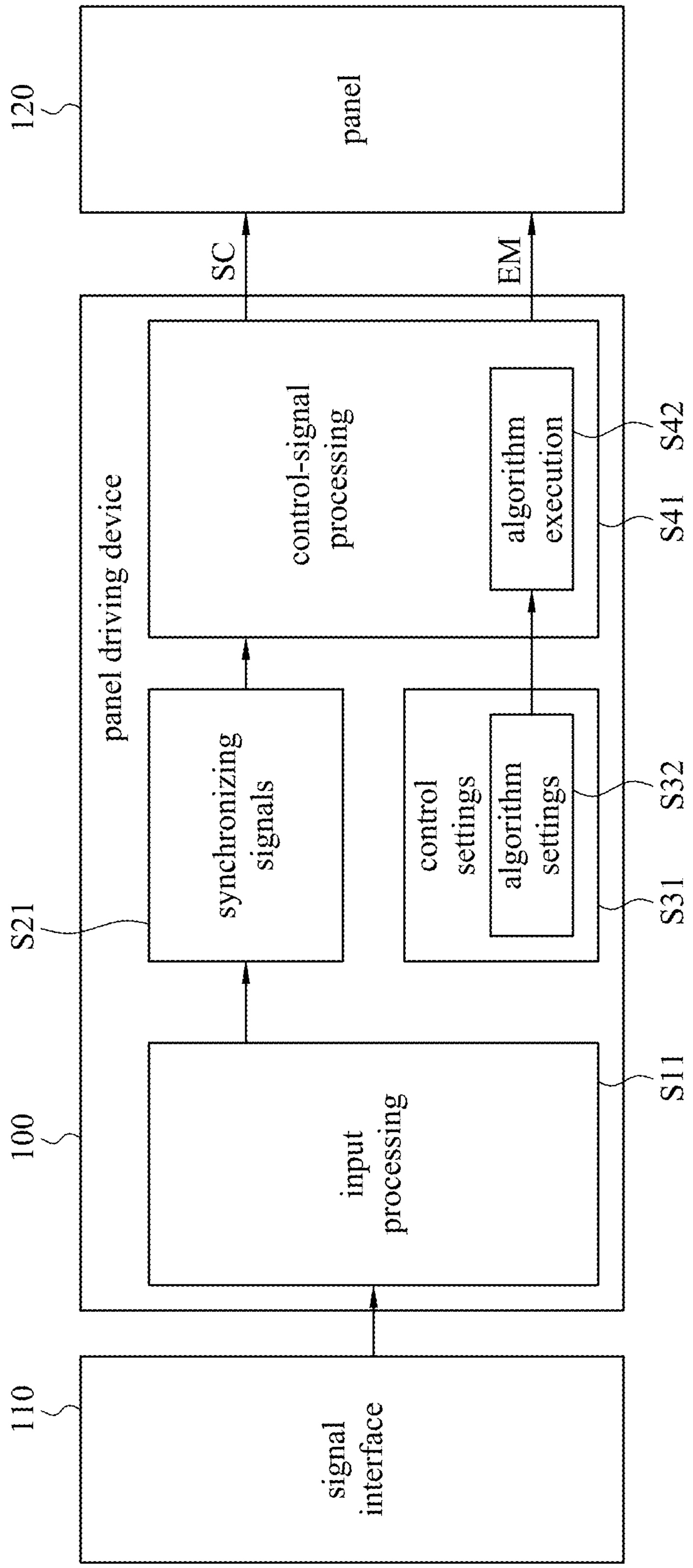
FIG. 1 illustrates a block diagram of a panel driving device according to one embodiment of the present disclosure.

In accordance with customary practice, the various features and elements in the drawings are not drawn to scale, but are drawn in a manner that best represents the specific features and elements relevant to the present disclosure. Furthermore, among the different drawings, similar elements/components are referred to by the same or similar reference numerals.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

Unless otherwise defined herein, scientific and technical terminologies employed in the present disclosure shall have the meanings that are commonly understood and used by one of ordinary skill in the art. In addition, unless it conflicts with the context, the singular noun used in this specification shall cover the plural form of the noun; and the plural noun used shall also include the singular form of the noun.

In addition, as used herein, “coupled” or “connected” may refer to directly physical or electrical contact, or indirectly physical or electrical contact between two or more elements. It may also refer to operations or actions between two or more elements.

In this present disclosure, the term “circuit” refers to an object that processes signals by one or more transistors and/or one or more active and passive components connected in a specific way.

In the specification and claims, certain words are used to refer to specific components. However, the person skilled in the art will understand that the same components may be referred to by different names. The components are not distinguished by their names in the specification and claims but is distinguished by the function of the components. The “include” mentioned in the specification and claims is an open-ended term, so it should be interpreted as “include but not limited to”.

Various embodiments of the present disclosure are discussed below with figures. For the sake of clarity, many practical details will be explained in the following description. It should be understood that the details should not limit the present disclosure. In other words, in some embodiments of the present disclosure, the details are not necessary. In addition, for simplification of figures, some known and commonly used structures and elements are illustrated simply in figures.

FIG. 1 illustrates a block diagram of a panel driving device according to one embodiment of the present disclosure. As shown in FIG. 1, in some embodiments, the panel driving device 100 can be a processor 100, and the panel driving device 100 is configured to output the scan signals SC and the light emitting signal EM. For example, the panel driving device 100 can be a light-emitting-diode driver (LED driver) or a light-emitting-diode controller (LED controller), but the present disclosure is not limited thereto.

In some embodiments, the panel driving device 100 can be coupled to the signal interface 110, and the panel driving device 100 can be coupled to the panel 120. The signal interface 110 is configured to provide multiple initial signals to the panel driving device 100. The panel 120 can receive scan signal SC and the light emitting signal EM to illuminate or display a picture.

For example, the signal interface 110 can be at least one of a serial peripheral interface (SPI), a mini low-voltage differential signaling (mini-LVDs) interface and a mobile industry processor interface (MIPI), and the signal interface 110 can have a horizontal synchronous (horizontal sync) signal, a vertical synchronous (vertical sync) signal, and a data enable signal (DE signal), but the present disclosure is not limited thereto.

For example, the panel 120 can be a display made of multiple micro light-emitting diode (micro LED) or multiple mini light-emitting diode (mini LED), but the present disclosure is not limited thereto.

In some embodiments, the processor 100 can execute multiple steps (such as the step S11, the step S21, the step S31, the step S32, and the step S41), and the detail description of the multiple steps will be given as follows.

In the step S11, input processing is executed. For example, the processor 100 can receive signal from the signal interface 110 and does the initial processing, but the present disclosure is not limited thereto.

In the step S21, signals are synchronized. For example, the processor 100 can further execute synchronizing signal (such as adjusting time sequences between scan signals and light emitting signals or time sequences between pulse signals) on the signals after inputting processing is finished, but the present disclosure is not limited thereto.

In the step S31, control settings are done. For example, the processor 100 can execute controlling the setting, such as do the setting of software or a algorithm, but the present disclosure is not limited thereto.

In the step S32, algorithm settings are done. For example, the processor 100 can execute the setting of the algorithm: set various parameters of the scan signals and light emitting signals in different frames, but the present disclosure is not limited thereto. In addition, regarding the details of the step S32, reference can be made to the following FIGS. 3, 4A, and 4B and the related description thereof.

In the step S41, control signals are processed. For example, the processor 100 can execute control signals processing to embed or execute the various set parameters in the scan signals or the light emitting signals, but the present disclosure is not limited thereto.

In the step S42, algorithm is executed. For example, the processor 100 can execute the algorithm, and the algorithm can be any algorithm or software that is configured to adjust the time of the scan signals or the light emitting signals, but the present disclosure is not limited thereto. In some embodiments, the algorithm mentioned above can achieve the driving effect of panel brightness uniformization, but the present disclosure is not limited thereto.

In some embodiments, the panel driving device 100 can have a memory therein. For example, the algorithm executed in the step S42 can be stored in the memory, but the present disclosure is not limited thereto. For example, the memory can be a storage hardware such as an electrically-erasable programmable read-only memory (EEPROM) or a flash memory, but the present disclosure is not limited thereto.

In some embodiments, the processor 100 executes the multiple steps mentioned above (such as the step S11, the step S21, the step S31, the step S32, the step S41) without a specific order. The steps mentioned above can be executed in the order that is arbitrarily adjusted according to user needs, but the present disclosure is not limited thereto.

Figure 2A:
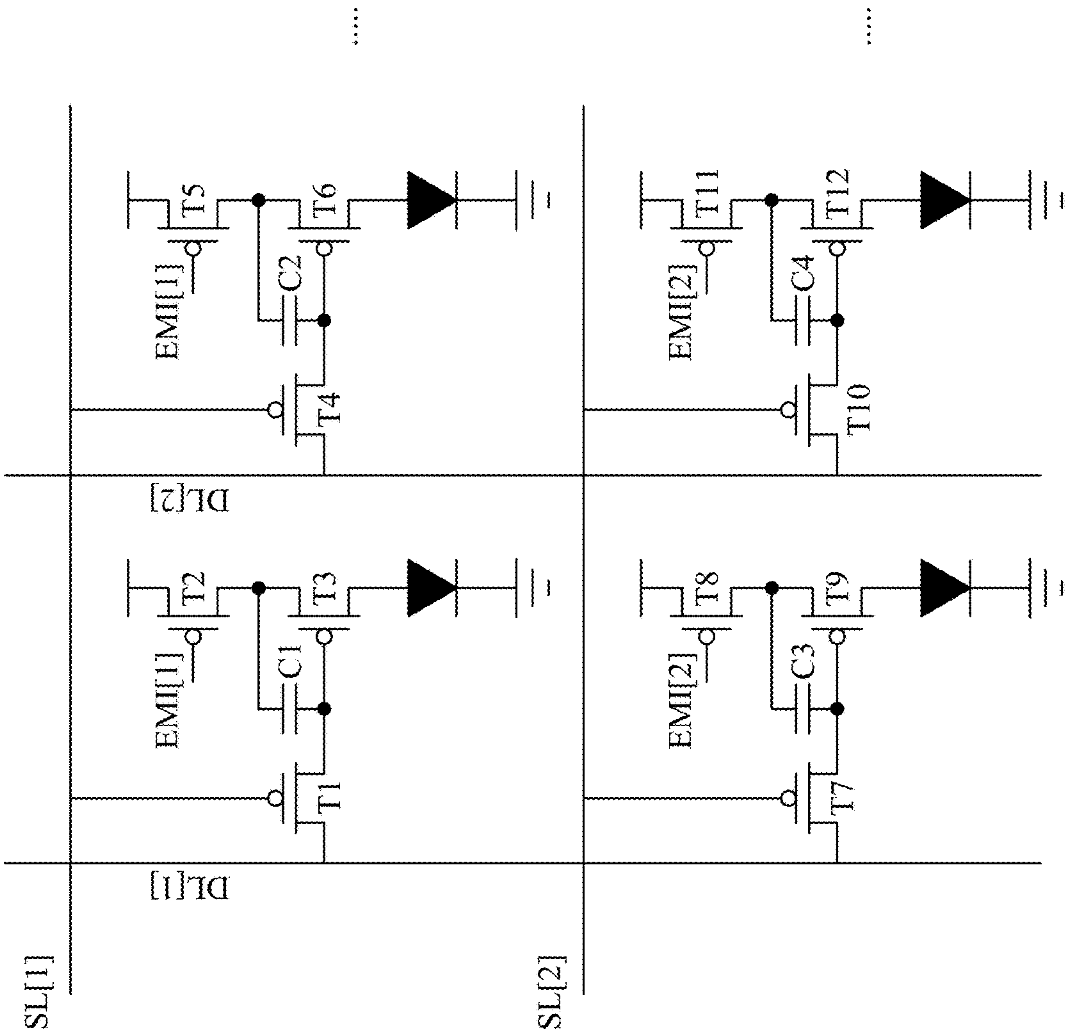
FIG. 2A illustrates a circuit diagram of a panel driving device according to one embodiment of the present disclosure.

FIG. 2A illustrates a circuit diagram of a panel driving device according to one embodiment of the present disclosure. As shown in FIG. 2A, in some embodiments, FIG. 2A can illustrate active matrix (AM) driving of micro LED, and the hardware therein can execute the operations such as charging the capacitors C1-C4, illuminating, etc. by the scan signals, the light emitting signals EMI[1]-EMI[2], and the data signals.

In some embodiments, the circuit in FIG. 2A corresponds to the panel 120 in FIG. 1, but the present disclosure is not limited thereto.

In some embodiments, the circuit in FIG. 2A can be made of multiple scan lines such as the scan lines SL[1] and SL[2], data lines such as the data lines DL[1] and DL[2], multiple transistors such as the transistors T1-T2, multiple capacitors such as the capacitors C1-C4 and light-emitting diodes, and the number of the hardware can be increased or decreased arbitrarily. For example, the multiple transistors such as the transistors T1-T2 can transistors of any conducting type such as N-type thin-film transistors or P-type thin-film transistors, but the present disclosure is not limited thereto.

In some embodiments, the transistors T2, T5, T8 and T11 can be coupled to high signals, and the multiple light-emitting diodes can be coupled to low signals and reference signals or be grounded, but the present disclosure is not limited thereto.

Figure 3:
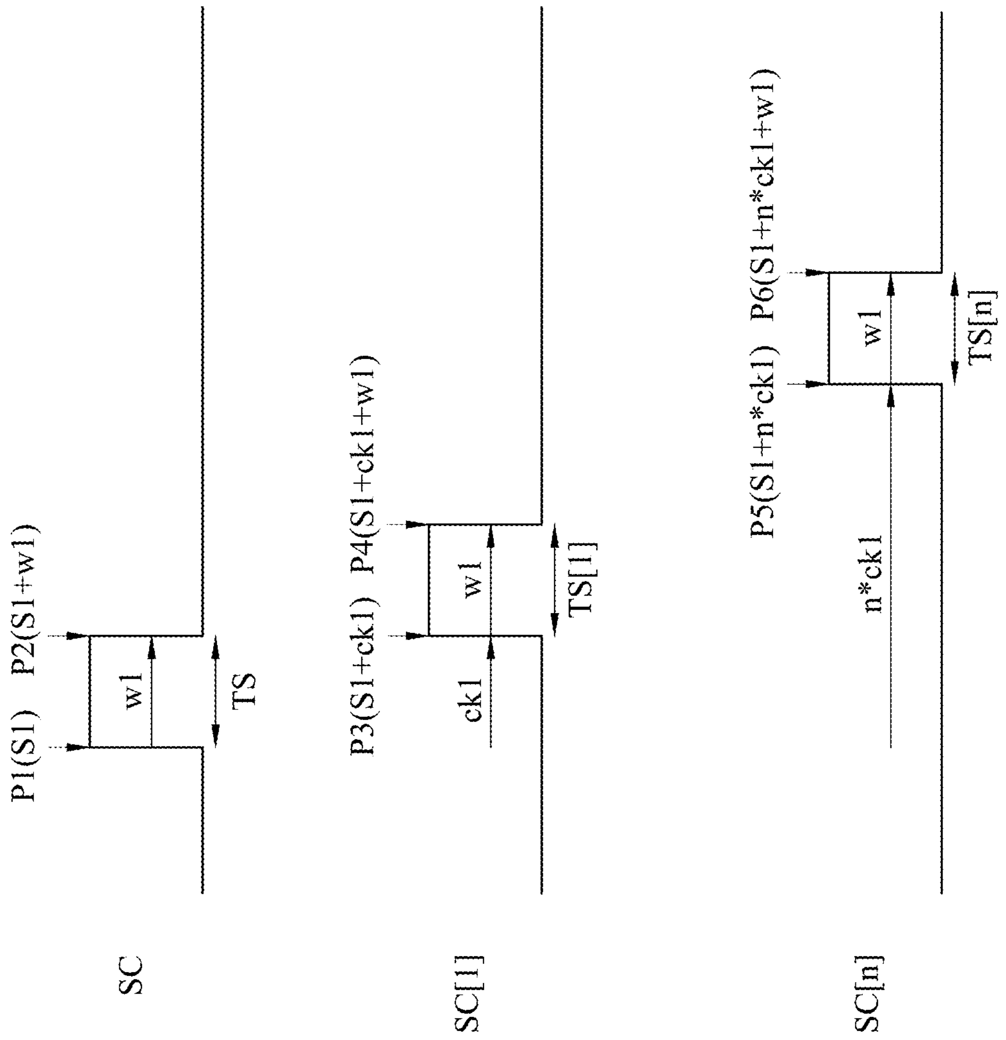
FIG. 3 illustrates a time sequence diagram of signals of a panel driving device according to one embodiment of the present disclosure.
Figure 4A:
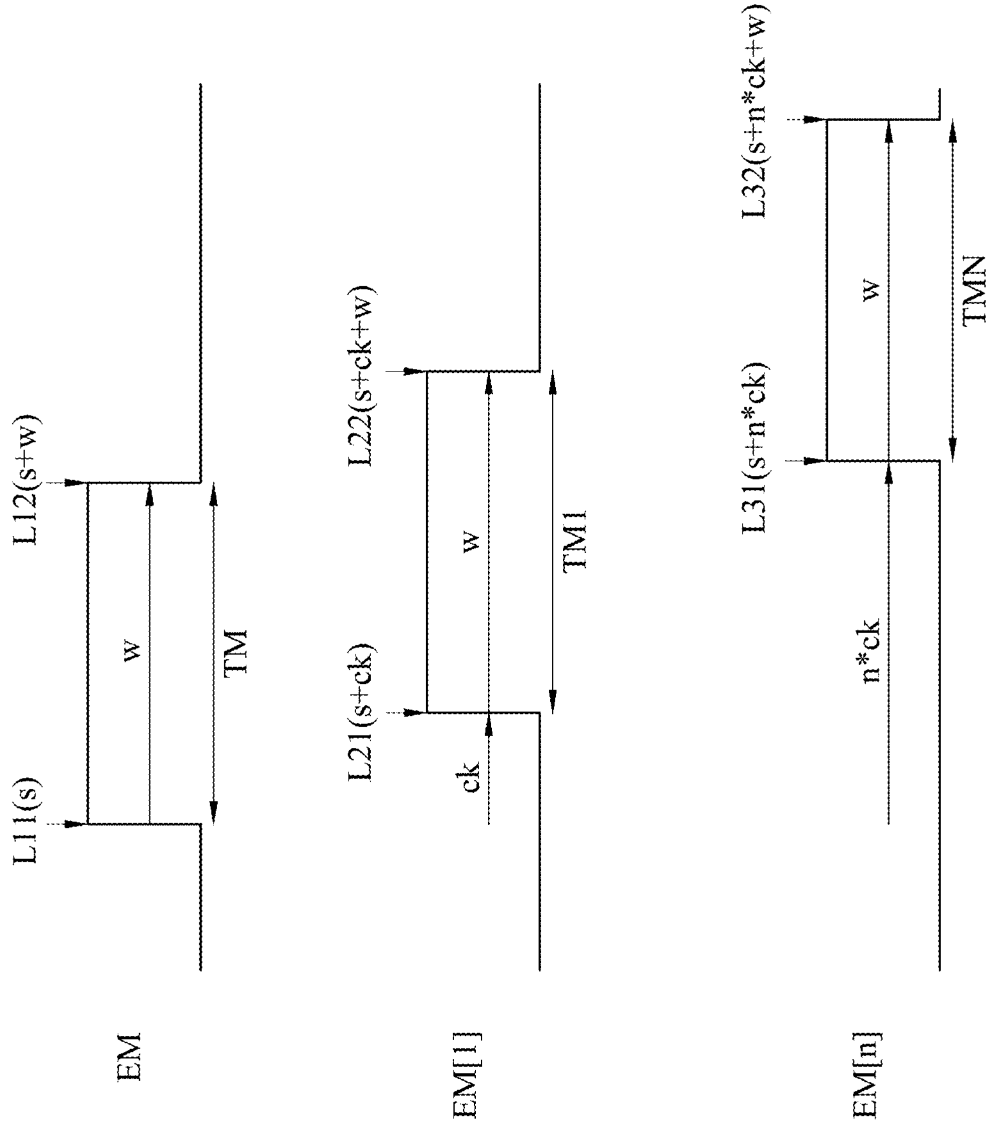
FIG. 4A illustrates a time sequence diagram of multiple signals of a panel driving device according to one embodiment of the present disclosure.
Figure 4B:
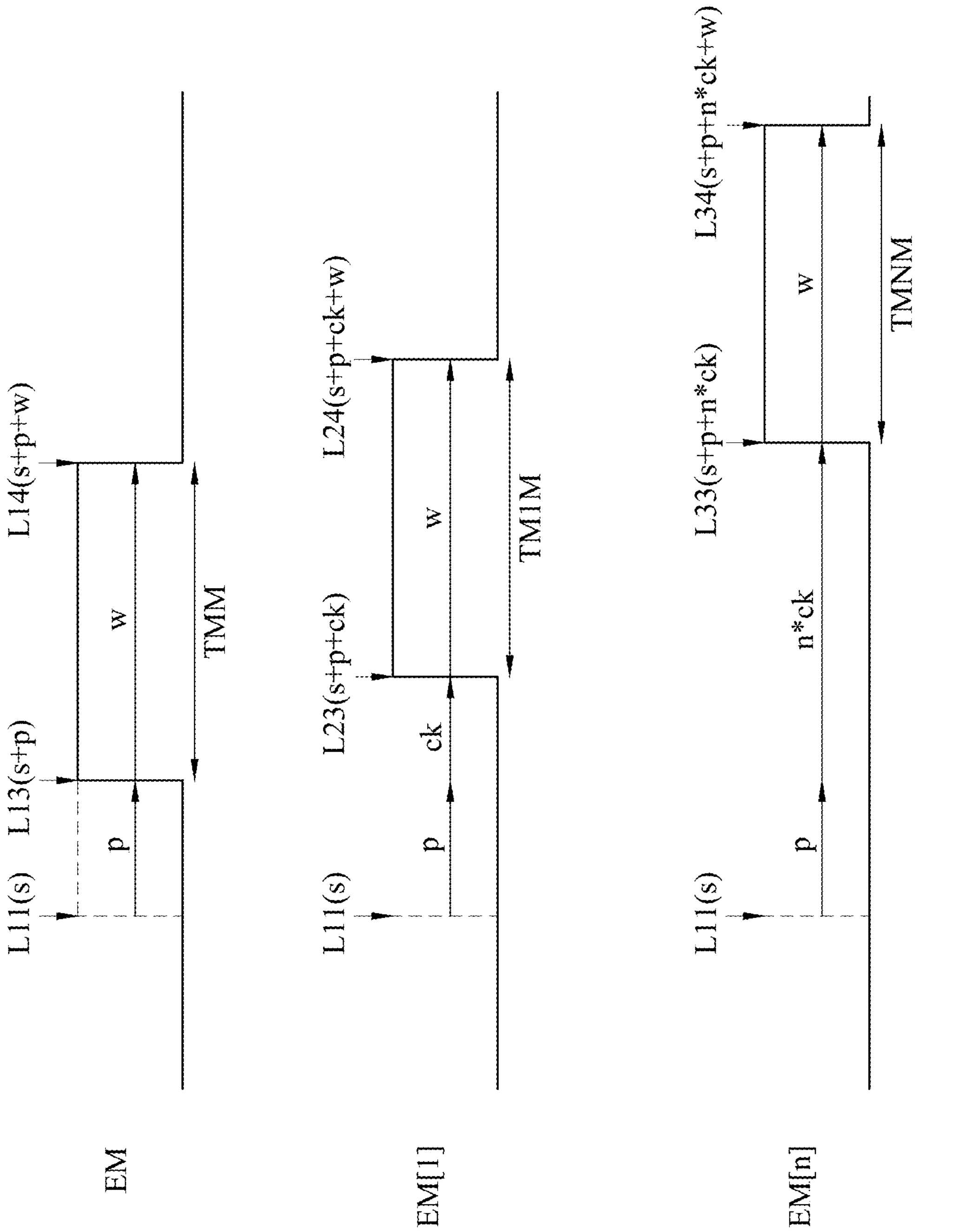
FIG. 4B illustrates a time sequence diagram of multiple signals of a panel driving device according to one embodiment of the present disclosure.

In some embodiments, the scan signals received by the scan lines SL[1] and SL[2] can correspond to the scan signals SC and SC[1] or SC[n] in FIG. 3, and the light emitting signals EMI[1] and EMI[2] can correspond to the light emitting signals EM and EM[1] or EM[n] in FIG. 4A or FIG. 4B, but the present disclosure is not limited thereto.

Figure 2B:
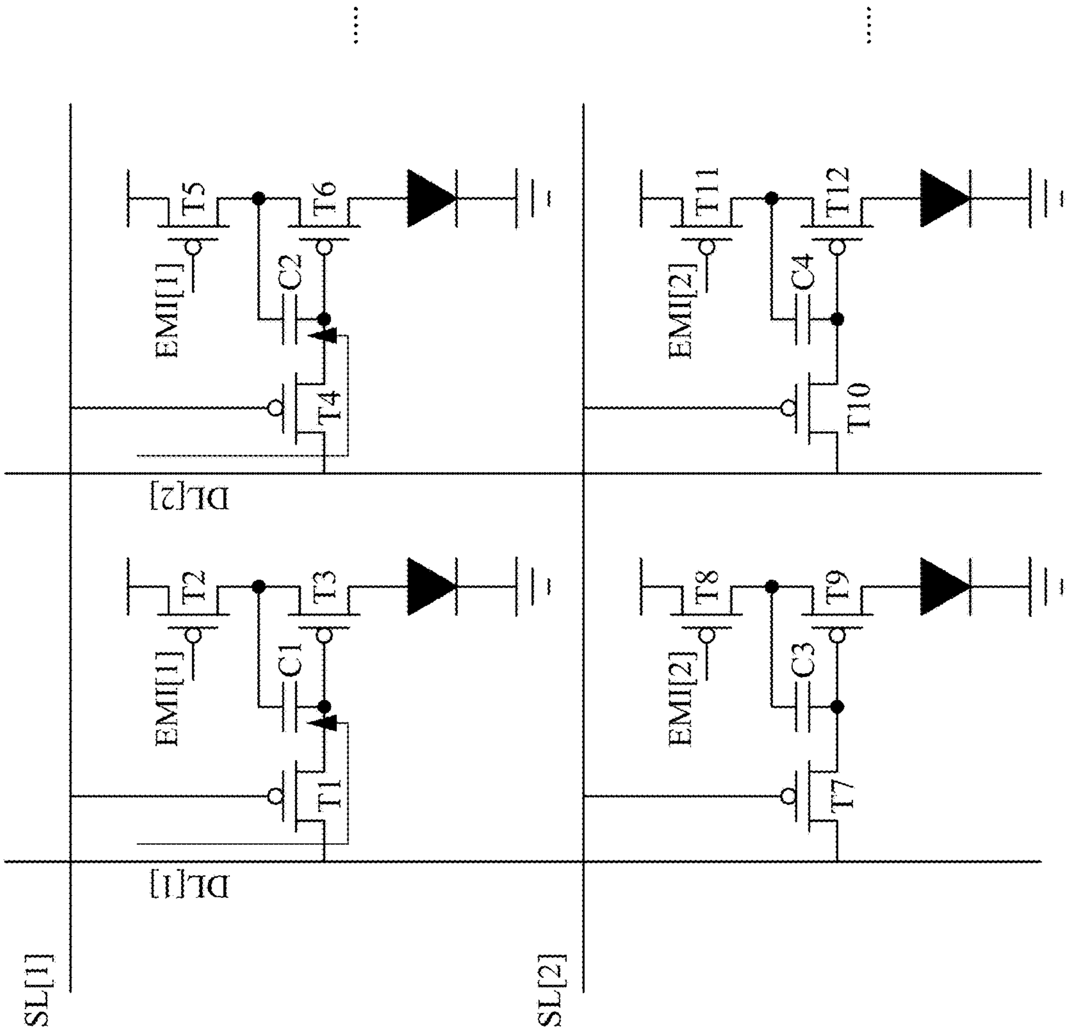
FIG. 2B illustrates a circuit diagram of a panel driving device according to one embodiment of the present disclosure.

FIG. 2B illustrates a circuit diagram of a panel driving device according to one embodiment of the present disclosure. As shown in FIG. 2B, in some embodiments, at a first time, the scan line SL[1] can receive the scan signals, the transistors T1 and T4 can receive the scan signals and be turned on according to the scan signals, the data lines DL[1] and DL[2] can receive the data signals, and the capacitors can receive and store the data lines.

Figure 2C:
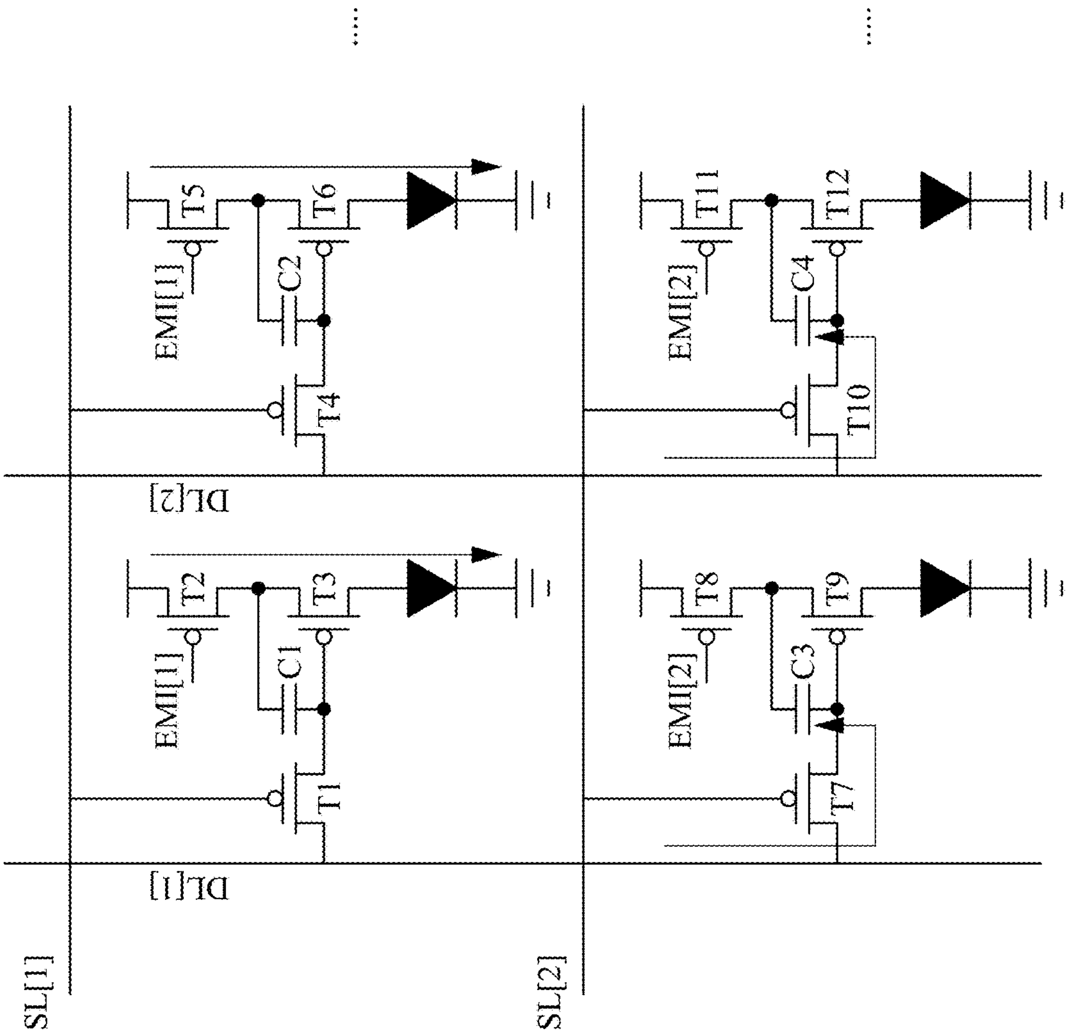
FIG. 2C illustrates a circuit diagram of a panel driving device according to one embodiment of the present disclosure.

FIG. 2C illustrates a circuit diagram of a panel driving device according to one embodiment of the present disclosure. As shown in FIG. 2C, in some embodiments, at a second time, the transistor T2 receive the light emitting signals EMI[1] and is turned on according to the light emitting signals EMI[1], the high signals can flow through the transistors T2 and T3 to the light-emitting diodes, and the light-emitting diodes receive the high signals and illuminates according to the high signals.

Meanwhile, the transistor T5 receives the light emitting signals and is turned on according to the light emitting signals, the high signals can flow through the transistors T5 and T6 to the light-emitting diodes, and the light-emitting diodes receive the high signals and illuminates according to the high signals.

Meanwhile, the scan line SL[2] can receive the scan signals, the transistors T7 and T10 can receive the scan signals and be turned on according to the scan signals, the data lines DL[1] and DL[2] can receive the data signals, and the capacitors C3 and C4 can receive and store the data signals.

Figure 2D:
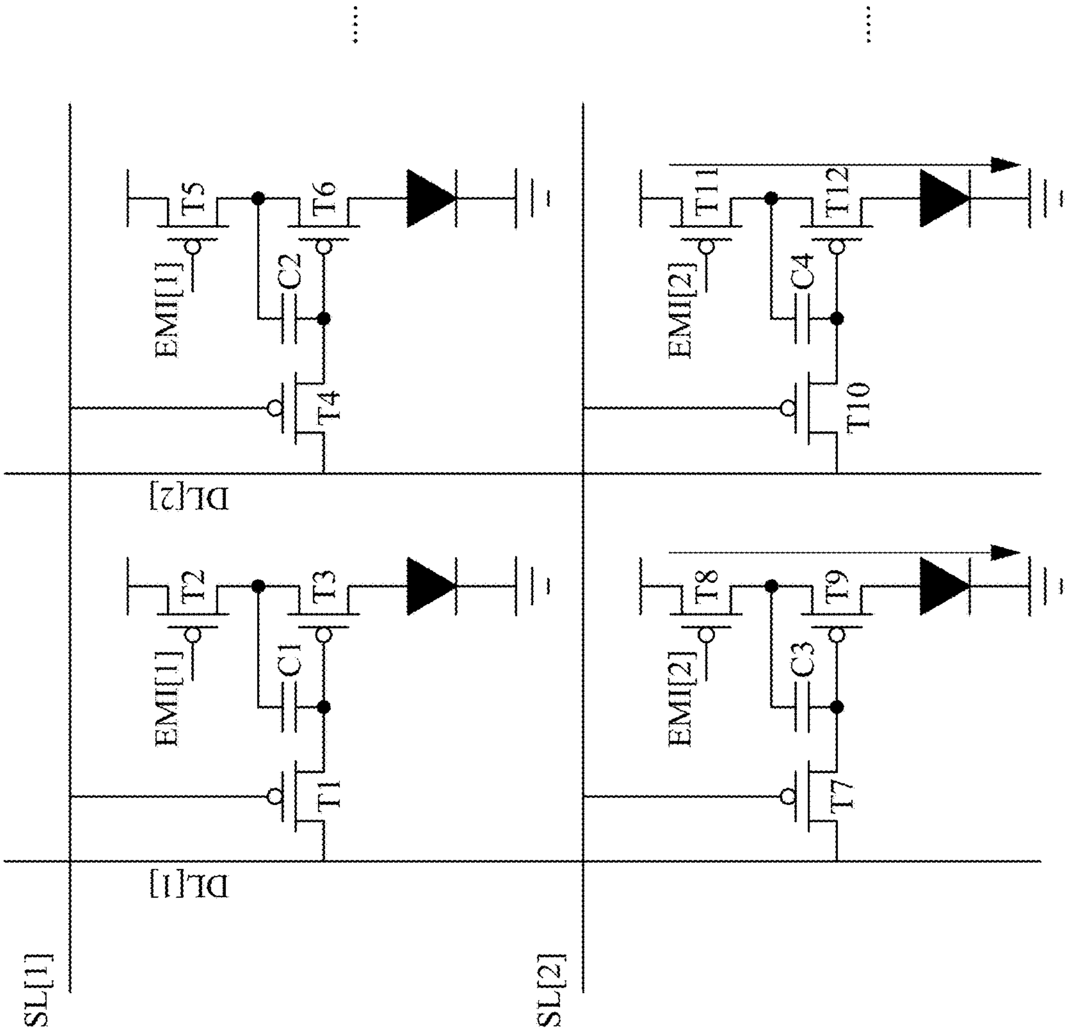
FIG. 2D illustrates a circuit diagram of a panel driving device according to one embodiment of the present disclosure.

FIG. 2D illustrates a circuit diagram of a panel driving device according to one embodiment of the present disclosure. As shown in FIG. 2D, in some embodiments, at a third time, the transistor T8 receive the light emitting signals EMI[2] and is turned on according to the light emitting signal EMI[2], the high signals can flow through the transistors T8 and T9 to the light-emitting diodes, and the light-emitting diodes receive the high signals and illuminates according to the high signals.

Meanwhile, the transistor T11 receive the emitting signals EMI[2] and is turned on according to the emitting signals EMI[2], the high signals can flow through the transistors T11 and T12 to the light-emitting diodes, and the light-emitting diodes receive the high signals and illuminates according to the high signals.

Please refer to FIGS. 2A to 2D together. In some embodiments, FIGS. 2B, 2C, and 2D can be in order as the operation sequence, but the present disclosure is not limited thereto. In some embodiments, FIG. 2B, and FIG. 2C and FIG. 2D can be arranged in any order into the operation order in FIG. 2A, but the present disclosure is not limited thereto.

FIG. 3 illustrates a time sequence diagram of signals of a panel driving device according to one embodiment of the present disclosure. As shown in FIG. 3, in some embodiments, the scan signal SC has a rise signal and a fall signal, and the rise signal and the fall signal can compose a pulse signal. At the time P1, the scan signal SC has the rise signal (or the fall signal), and over a period w1, at the time P2, the scan signal SC has the fall signal (or the rise signal). For example, the time P1 can be S1, the time P2 can be S1+w1, and the interval TS can be a set of multiple times, such as {S1, S1+1, S1+2, . . . , S1+w1}, but the present disclosure is not limited thereto.

In some embodiments, the scan signal SC[1] can be the signal which is formed after the scan signal SC goes over the period ck1, the scan signal SC[1] has the rise signal and the fall signal, and the rise signal and the fall signal can compose the pulse signal. At the time P3, the scan signal SC[1] has the rise signal (or the fall signal), and over the period w1, at the time P4, the scan signal SC has the fall signal (or the rise signal). For example, the time P3 can be S1+ck1, the time P4 can be S1+ck1+w1, and the interval TS[1] can be a set of multiple times, such as {S1+ck1, S1+ck1+1, S1+ck1+2, . . . , S1+ck1+w1}, but the present disclosure is not limited thereto.

In some embodiments, the scan signal SC and the scan signal SC[1] have the relation of pre- and post-stages, i.e., the scan signal SC and the scan signal SC[1] have the periodic relation, but the present disclosure is not limited thereto.

In some embodiments, the scan signal SC[n] can be the signal which is formed after the scan signal SC goes over the period n×ck1, the scan signal SC[n] has the rise signal and the fall signal, and the rise signal and the fall signal can compose the pulse signal. At the time P5, the scan signal SC[n] has the rise signal (or the fall signal), and over the period w1, at the time P4, the scan signal SC[n] has the fall signal (or the rise signal). For example, the time P5 can be S1+n×ck1, the time P6 can be S1+n×ck1+w1, and the interval TS[n] can be a set of multiple times, such as {S1+n×ck1, S1+n×ck1+1, S1+n×ck1+2, . . . S1+n×ck1+w1}, but the present disclosure is not limited thereto.

In some embodiments, there are n scan signals in total in a same frame, such as the scan signal SC, the scan signal SC[1], . . . the scan signal SC[n], and the scan signal SC, the scan signal SC[1], and the scan signal SC[n] have the relation of pre- and post-stages, i.e., the scan signal SC, the scan signal SC[1] and the scan signal SC[n] have the periodic relation, but the present disclosure is not limited thereto. In some embodiments, a frame mentioned above includes multiple times P1-P6. For example, the times P1-P6 are located within a frame mentioned above, but the present disclosure is not limited thereto.

In some embodiments, there are n scan signals in total in different frames, such as the scan signal SC, the scan signal SC[1], . . . the scan signal SC[n], and the scan signal SC, the scan signal SC[1] and the scan signal SC[n] have the relation of pre- and post-stages, i.e., the scan signal SC, the scan signal SC[1] and the scan signal SC[n] have the periodic relation, so as to achieve the effect of cross-frame driving, but the present disclosure is not limited thereto.

In some embodiments, the interval TS[n] can be the parameter t_SCAN[g], the parameter t_SCAN[g] is the period of the scan gate line g, and g can be 1−n (i.e., n gate lines), but the present disclosure is not limited thereto.

In some embodiments, the scan signal SC, the scan signal SC[1] and the scan signal SC[n] in FIG. 3 can correspond to the scan signal SC in FIG. 1, but the present disclosure is not limited thereto.

FIG. 4A illustrates a time sequence diagram of multiple signals of a panel driving device according to one embodiment of the present disclosure. As shown in FIG. 4A, the light emitting signal EM has the rise signal and the fall signal, and the rise signal and the fall signal can compose the pulse signal. At the time L11, the light emitting signal EM has the rise signal (or the fall signal), and over the period w, at the time L12, the light emitting signal EM has the fall signal (or the rise signal). For example, the time L11 can be s, the time L12 can be s+w, and the interval TM can be a set of multiple times, such as {s, s+1, s++2, . . . , s+w}, but the present disclosure is not limited thereto.

In some embodiments, the light emitting signal EM[1] can be the signal which is formed after the light emitting signal EM goes over the period ck, the light emitting signal EM[1] has the rise signal and the fall signal, and the rise signal and the fall signal can compose the pulse signal. At the time L21, the emitting light signal EM[1] has the rise signal (or the fall signal), and over the period w, at the time L22, the light emitting signal EM[1] has the fall signal (or the rise signal). For example, the time L21 can be s+ck, the time L22 can be s+ck+w, and the interval TM1 can be a set of multiple times, such as {s+ck, s+ck+1, s+ck+2, . . . , s+ck+w}, but the present disclosure is not limited thereto.

In some embodiments, the light emitting signal EM[n] can be the signal which is formed after the light emitting signal EM goes over the period n×ck, the light emitting signal EM[n] has the rise signal and the fall signal, and the rise signal and the fall signal can compose the pulse signal. At the time L31, the light emitting signal EM[n] has the rise signal (or the fall signal), and over the period w, at the time L32, the light emitting signal EM[n] has the fall signal (or the rise signal). For example, the time L31 can be s+n×ck, the time L22 can be s+n×ck+w, and the interval TMN can be a set of multiple times, such as {s+n×ck, s+n×ck+1, s+n× ck+2, . . . , s+n×ck+w}, but the present disclosure is not limited thereto.

In some embodiments, there are n light emitting signals in total in a same frame, such as the light emitting signal EM, the light emitting signal EM[1], . . . the light-emitting signal EM[n], and the light-emitting signal EM, the light emitting signal EM[1], and the light emitting signal EM[n] have the relation of pre- and post-stages, i.e., the light emitting signal EM, the light emitting signal EM[1] and the light emitting signal EM[n] have the periodic relation, but the present disclosure is not limited thereto. In some embodiments, a frame mentioned above includes the multiple times L11, L12, L21, L22, L31 and L32. For example, all of the multiple times L11, L12, L21, L22, L31 and L32 are located within a frame mentioned above, but the present disclosure is not limited thereto.

In some embodiments, there are n light emitting signals in total in different frames, such as the light emitting signal EM, the light emitting signal EM[1], . . . the light emitting signal EM[n], and the light emitting signal EM, the light emitting signal EM[1] and t the light emitting signal EM[n] have the relation of pre- and post-stages, i.e., the light emitting signal EM, the light emitting signal EM[1] and the light emitting signal EM[n] have the periodic relation, but the present disclosure is not limited thereto.

FIG. 4B illustrates a time sequence diagram of multiple signals of a panel driving device according to one embodiment of the present disclosure. As shown in FIG. 4B, in some embodiments, the light emitting signal EM can be the signal which is formed after the light emitting signal EM in FIG. 4A goes over the offset time p. At the time L13, the light emitting signal EM has the rise signal (or the fall signal), and over the period w, at the time L14, the light emitting signal EM has the fall signal (or the rise signal). For example, the time L13 can be s+p, the time L14 can be s+p+w, and the interval TMM can be a set of multiple times, such as {s+p, s+p+1, s+p+2, . . . , s+p+w}, but the present disclosure is not limited thereto.

In some embodiments, the light emitting signal EM[n] can be the signal which is formed after the light emitting signal EM goes over the period n×ck. At the time L33, the emitting light signal EM[n] has the rise signal (or the fall signal), and over the period w, at the time L34, the light emitting signal EM[n] has the fall signal (or the rise signal). For example, the time L33 can be s+p+n×ck, the time L22 can be s+n×ck+w, and the interval TMNM can be a set of multiple times, such as {s+n xck+p, s+nx ck+p+1, s+n xck+p+2, . . . , s+n×ck+p+w}, but the present disclosure is not limited thereto.

In some embodiments, the multiple intervals TM, TM1, TMN, TMM, TM1M and TMNM each can be t_EMIT[p, g, k], t_EMIt[p, g, k] is the period of the gate line g, and the parameter g can be 1−n (i.e., n gate lines is scanned, and n can be a positive integer), and the parameter p can be 1-a (i.e., the illumination is repeatedly executed b times in total. In other words, the emitting signals have k pulse signals in a frame), but the present disclosure is not limited thereto.

In some embodiments, the interval TM can be t_EMIT, the interval TMM can be t_EMIT, the interval TM1 can be t_EMIT[1], the interval TM1M can be t_EMIT[p, 1, k], the interval TMN can be t_EMIT[n], and the interval TMNM can be t_EMIT[p, g, k], but the present disclosure is not limited thereto.

In some embodiments, the processor 100 (as shown in FIG. 1) can collect the parameters p mentioned above to form the parameters p', and the parameters p' represent a set of the offset times p with which t_EMIT and t_SCAN[g] do not overlap, but the present disclosure is not limited thereto.

Figure 5A:
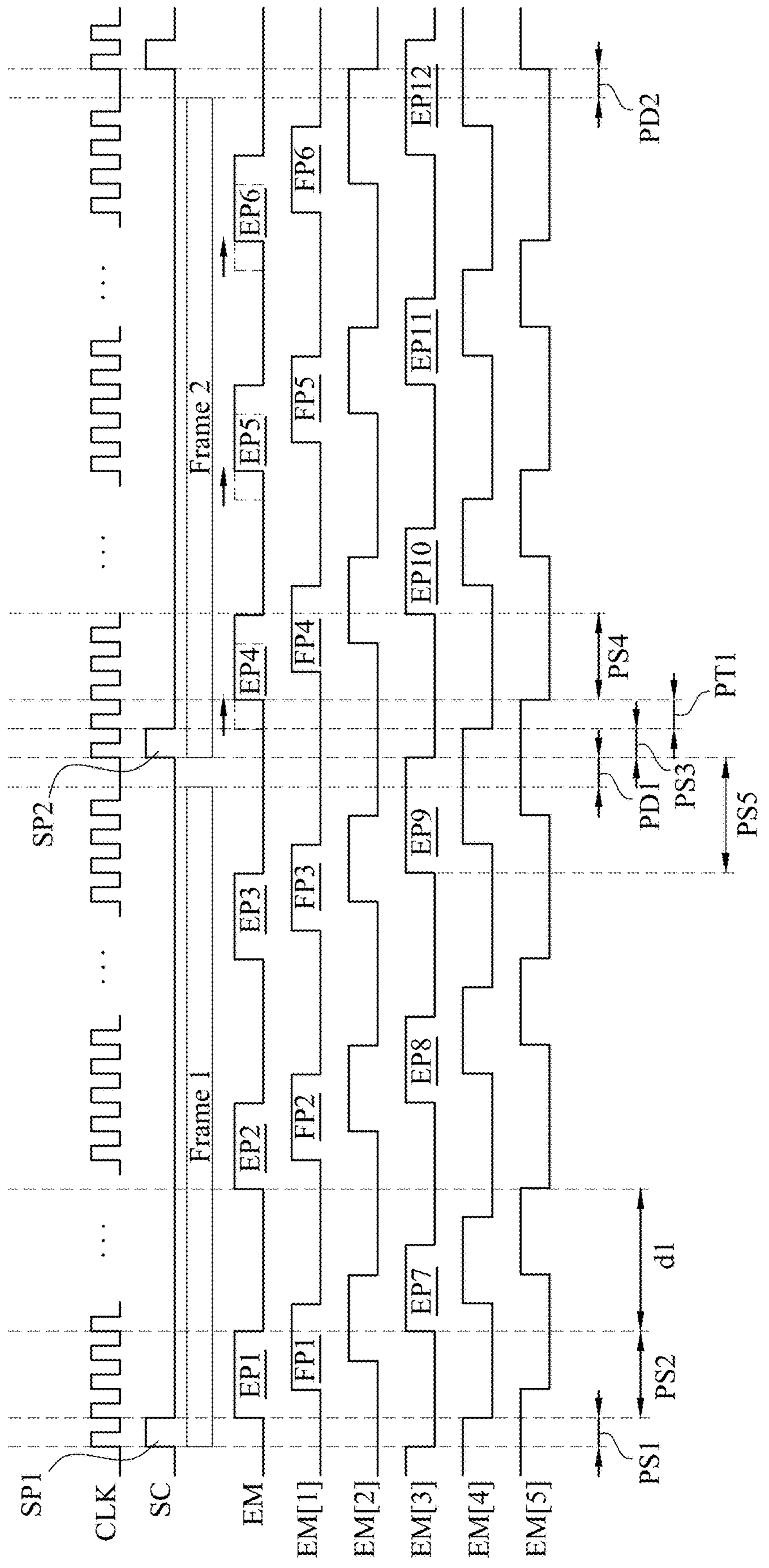
FIG. 5A illustrates a time sequence diagram of multiple signals of a panel driving device according to one embodiment of the present disclosure.

FIG. 5A illustrates a time sequence diagram of multiple signals of a panel driving device according to one embodiment of the present disclosure. As shown in FIG. 5A, in some embodiments, FIG. 5A is provided with the first frame Frame 1 and the second frame Frame 2, and a cross-frequency period PD is provided between the first frame Frame 1 and the second frame Frame 2. FIG. 5A is provided with the clock signal CLK, the scan signal SC and the multiple light emitting signals EM and EM[1]-EM[5]. The multiple light emitting signals EM and EM[1]-EM[5] each have multiple pulse signals.

In some embodiments, the light emitting signal EM[2] is a post-stage signal of the light emitting signal EM[1], the light emitting signal EM[3] is a post-stage signal of the light emitting signal EM[2], the light emitting signal EM[4] is a post-stage signal of the light emitting signal EM[3], and the light emitting signal EM[5] is a post-stage signal of the light emitting signal EM[4].

Please refer to FIG. 1 and FIG. 5A together. In some embodiments, the processor 100 (as shown in FIG. 1) is configured to generate the initial scan signal SC, the initial light emitting signal EM and the clock signal CLK.

For example, the initial scan signal SC can be any common light emitting signal in the field of panels, the initial light emitting signal EM can be any common light emitting signal EM in the field of panels, and the clock signal CLK can be any common clock signal, but the present disclosure is not limited thereto.

Furthermore, the initial scan signal SC has the initial scan pulse signal SP1 in the first frame Frame 1. For example, the initial scan signal SC in FIG. 5A can correspond to the scan signal SC in FIG. 3, and the associated operation and the design logic of the initial scan signal SC are similar to that of the scan signal SC in FIG. 3, but the present disclosure is not limited thereto.

Then, the initial scan signal SC has the initial scan pulse signal SP2 in the second frame Frame 2, and the second frame Frame 2 is located after the first frame Frame 1. For example, the initial scan signal SC in the second frame Frame 2 can have the initial scan pulse signal SP2 after the first frame Frame 1 ends, and the time sequence in the second frame Frame 2 is similar to the time sequence of the initial scan pulse signal SP1 in the first frame Frame 1, but the present disclosure is not limited thereto.

Furthermore, the initial light emitting signal EM has the initial pulse signal EP1. For example, the pulse starting point of the initial light emitting signal EP1 of the initial light emitting signal EM (i.e., where the rise signal is located) can be aligned to the pulse end point of the initial scan pulse signal SP1 of the initial scan signal SC (i.e., where the fall signal is located) and similarly, the pulse starting point of the initial light emitting signal EP1 of the initial light emitting signal EM can be separated from the pulse end point of the initial scan pulse signal SP1 of the initial scan signal SC, but the present disclosure is not limited thereto.

In some embodiments, when the parameter k is 1 to 3, the initial light emitting signal EM can have multiple initial light emitting signals, such as the initial light emitting pulse signal EP1 (the parameter k is 1), the initial light emitting pulse signal EP2 (the parameter k is 2) and the initial light emitting pulse signal EP3 (the parameter k is 3), and the time difference between the initial light emitting pulses signal EP1, the initial light emitting pulse signal EP2 and the initial light emitting signal EP3 (such as the period d1) can be the same or different, but the present disclosure is not limited thereto.

Then, in the second frame Frame 2, the processor 100 shifts the initial light emitting pulse signal EP1 of the initial light emitting signal EM by the offset time PT1 to form the first light emitting pulse signal EP4, and the offset time PT1 is associated with the frame number.

For example, when the pulse starting point of the initial light emitting pulse signal EP1 of the initial light emitting signal EM can be aligned to the pulse end point of the initial pulse signal SP1 of the initial scan signal SC, the pulse starting point of the first pulse signal EP4 of the initial light emitting signal EM can be shifted from the pulse end point of the initial pulse signal SP2 of the initial scan signal SC by the offset time PT1, but the present disclosure is not limited thereto.

In addition, the offset times of different frames can be different. For example, the offset time can be the first offset time PT1 in the second frame Frame 2 (as shown in later FIG. 5B), the offset time can be the second offset time PT2 in the third frame Frame 3 (as shown in later FIG. 5B), and the offset time can be the third offset time PT3 in the fourth frame Frame 4 (as shown in later FIG. 5B), but the present disclosure is not limited thereto. In some embodiments, the offset time PT1 can be the parameter p mentioned in FIG. 4B, but the present disclosure is not limited thereto. In some embodiments, the first offset time PT1 can correspond to the parameter p of 1, the second offset time PT2 can correspond to the parameter p of 3, and the third offset time PT3 can correspond to the parameter p of 7, but the present disclosure is not limited thereto.

In some embodiments, in the second frame Frame 2, the processor 100 shifts the initial light emitting pulse signal EP1 of the initial light emitting signal EM by the offset time PT1 to form the first light emitting pulse signal EP4, the processor 100 shifts the initial light emitting pulse signal EP2 of the initial light emitting signal EM by the offset time PT1 to form the first light emitting pulse signal EP5, and the processor 100 shifts the initial light emitting pulse signal EP3 of the initial light emitting signal EM by the offset time PT1 to form the first light emitting pulse signal EP6.

In some embodiments, the processor 100 outputs the second light emitting signals EM[3] according to the initial scan signal SC and the initial light emitting signal EM. For example, the second light emitting signal EM[3] can be the post-stage signal of the initial light emitting signal EM, but the present disclosure is not limited thereto. In some embodiments, the pulse signal EP7, EP8 or EP9 of the second light emitting signal EM[3] has the light emitting pulse period, the scan signal SC has the scan pulse period PS1, and the light emitting pulse period and the scan pulse period PS1 do not overlap each other, but the present disclosure is not limited thereto.

Then, the second light emitting signals EM[3] has the second light emitting pulse signal EP7 in the first frame Frame 1. In some embodiments, the second light emitting signal EM[3] can have multiple second light emitting pulse signals (such as light emitting pulse signals Ep7, EP8 and EP9) in the first frame Frame 1, but the present disclosure is not limited thereto.

Furthermore, the second pulse signal EP7 of the second light emitting signal EM[3] is shifted from the initial pulse signal EP1 of the initial light emitting pulse EM. For example, the light emitting EM[3] can be the post-stage signal of the initial light emitting pulse signal EM, the initial pulse signal EP1 can be shifted by the period PS2 to form the second light emitting pulse signal EP7, and the period PS2 can correspond to the period n×ck and n can be 3, but the present disclosure is not limited thereto.

In some embodiments, in the second frame Frame 2, the processor 100 shifts the second light emitting pulse signal EP7 of the second light emitting signal EM[3] by the offset time PT1 to form the third light emitting pulse signal EP10, the processor 100 shifts the second light emitting pulse signal EP8 of the second light emitting signal EM[3] by the offset time PT1 to form the third light emitting pulse signal EP11, and the processor 100 shifts the second light emitting pulse signal EP9 of the second light emitting signal EM[3] by the offset time PT1 to form the third light emitting pulse signal EP12.

In some embodiments, the initial light emitting signal EM and the second light emitting signal EM[1] have the relation of pre- and post-stages.

In some embodiments, the pulse period of the initial light emitting pulse signal EP1, EP2 or EP3 does not overlap the first cross-frequency period PD1 of the processor 100, and the first cross-frequency period PD1 is associated with the clock signal CLK.

For example, the first cross-frequency period PD1 can be the period during which the first frame Frame 1 is switched toward the second frame Frame 2, the first cross-frequency period can be located during the low signal of the clock signal CLK, and the pulse period of the initial light-emitting pulse signal EP3, and the second light emitting can be beyond overlapping the first cross-frequency period PD1, but the present disclosure is not limited thereto.

In some embodiments, the pulse period of the second light emitting pulse signals EP7, EP8 or EP9 overlaps the first cross-frequency period PD1 of the processor 100, and the first cross-frequency period PD1 is associated with the clock signal CLK. For example, the pulse period PS5 of the second light emitting pulse signal EP9 can overlap the first cross-frequency period PD1 of the processor 100, but the present disclosure is not limited thereto.

In some embodiments, the pulse period of the initial light emitting pulse signals EP1, EP2 or EP3 overlaps the first cross-frequency period PD1 of the processor 100. For example, the pulse period of the initial light emitting pulse signal EP3 can overlap the first cross-frequency period PD1, but the present disclosure is not limited thereto.

In some embodiments, the pulse period of the second light emitting pulse signal EP7, EP8 or EP9 does not overlap the first cross-frequency period PD1 of the processor 100. For example, the pulse period PS5 of the second light emitting pulse signal EP9 can be beyond overlapping the first cross-frequency period PD1 of the processor 100, but the present disclosure is not limited thereto.

Figure 5B:
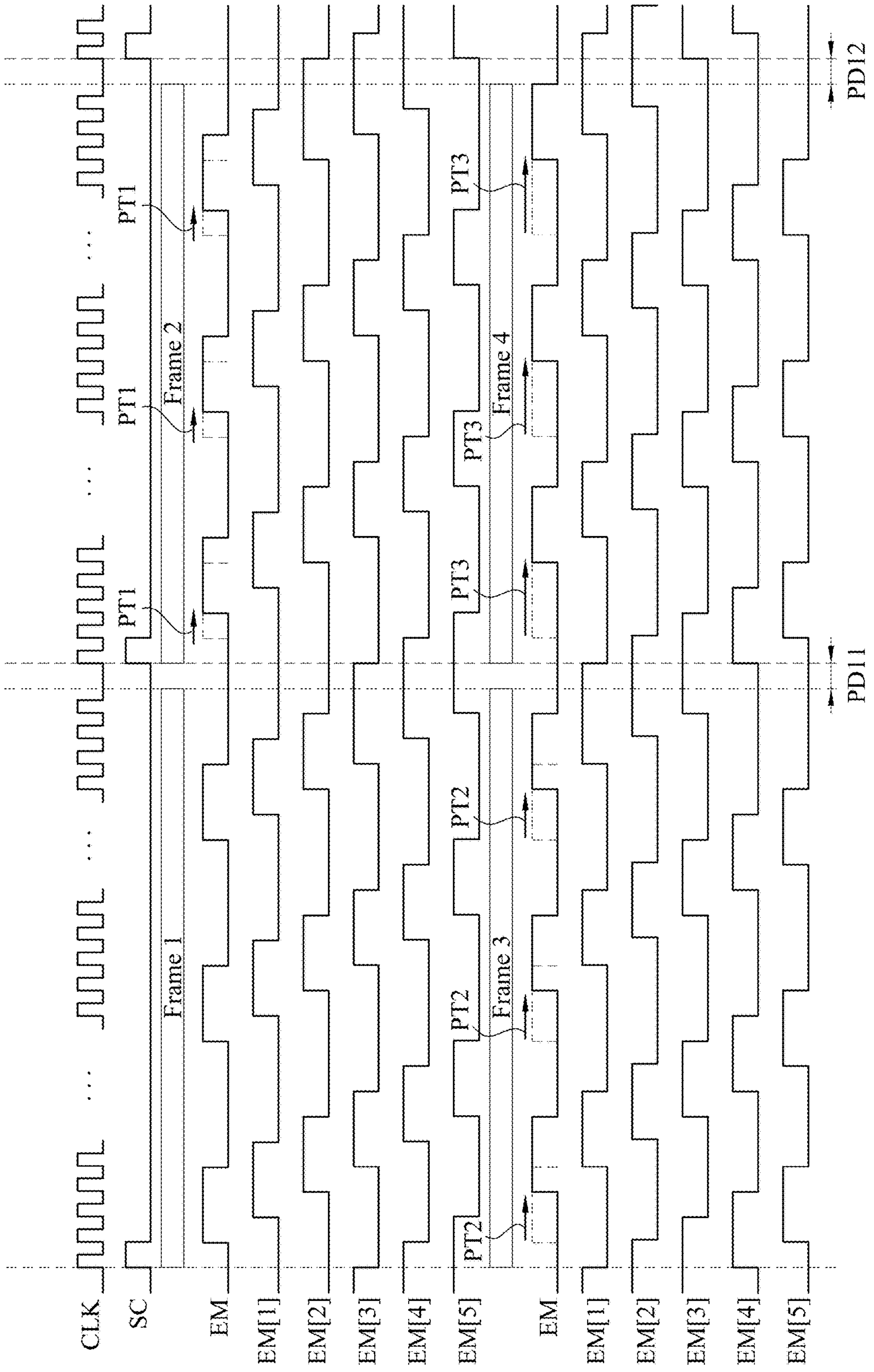
FIG. 5B illustrates a time sequence diagram of multiple signals of a panel driving device according to one embodiment of the present disclosure.

FIG. 5B illustrates a time sequence diagram of multiple signals of a panel driving device according to one embodiment of the present disclosure. As shown in FIG. 5B, in some embodiments, FIG. 5A is provided with the first frame Frame 1, the second frame Frame 2, the third frame Frame 3 and the fourth frame Frame 4, and the cross-frequency period PD12 is provided between the second frame Frame 2 and the third frame Frame 3.

In some embodiments, the multiple signals within the first frame Frame 1 and the second frame in FIG. 5B, such as the clock signal CLK, the scan signal SC and the light emitting signals EM-EM[5], can correspond to the multiple signals within the first frame Frame 1 and the second frame Frame 2 in FIG. 5A, but the present disclosure is not limited thereto.

Please refer to FIG. 5A and FIG. 5B together, in some embodiments, the processor 100 sets the maximum of the cross-frequency number and the minimum of the cross-frequency number according to the cross-frequency relation of signals for the first cross-frequency period, when in the first frame Frame 1. For example, the cross-frequency number can be the number for overlapping the first cross-frequency period and the pulse signals of the scan signals such as the light emitting signals EM[1]-EM[5], but the present disclosure is not limited thereto.

In some embodiments, the cross-frequency number can be L[p', g, k] and L[p', g, k], detailed as follows.

$$L[p',g,k]=\begin{Bmatrix} L[1,1,1]=0 & L[1,1,2]=0 & L[1,1,3]=0\\ L[1,2,1]=0 & L[1,2,2]=0 & L[1,2,3]=1\\ L[1,3,1]=0 & L[1,3,2]=0 & L[1,3,3]=1\\ L[1,4,1]=0 & L[1,4,2]=0 & L[1,4,3]=0\\ L[1,5,1]=0 & L[1,5,2]=0 & L[1,5,3]=0 \end{Bmatrix} \quad \text{Equation 1}$$

The cross-frequency number L[p', g, k] mentioned above meets Equation 1 mentioned above, in which p'=1, g=1-5, k=1-3, and Max{L[1, g, k]=1, Min{L[1, g, k]}}=0.

In some embodiments, the difference of the cross-frequency numbers can be Max{L[1, g, k]}-Min{L[1, g, k]}, and Max{L[1, g, k]}-Min{L[1, g, k]} will be descript in detail as follows.

$$\mathrm{Max}\{L[1,g,k]\}-\mathrm{Min}\{L[1,g,k]\}<q. \quad \text{Equation 2}$$

The difference of the cross-frequency numbers Max{L[1, g, k]}-Min{L[1, g, k]} can meet the Equation 2 mentioned above, and the parameter q can be the threshold value demanded by the minimum difference.

In some embodiments, the processor 100 sets the cross-frequency threshold value such as the parameter q, the processor 100 determines whether a difference between the maximum of the cross-frequency number (such as the maximum Max{L[1, g, k]}) and the minimum of the cross-frequency number (such as the minimum Min{L[1, g, k]}) is less than the cross-frequency threshold value (such as the parameter q) or not.

In some embodiments, the processor 100 obtains the minimum difference and the sets of cross-frequency numbers.

In some embodiments, the processor 100 can be configured to determine whether all sets are completed or not in the first frame Frame 1 to the fourth frame Frame 4 or not. Then, the processor 100 can be configured to determine whether the single mode or the continuous mode. Furthermore, the processor 100 can retain the set value of the cross-frequency number L[p', g, k]. For example, the single mode can be one mode in a certain frame (such as the first frame Frame 1), the continuous mode can be one mode in multiple frames (such as the first frame Frame 1 to the fourth frame Frame 4), but the present disclosure is not limited thereto.

In some embodiments, the cross-frequency number L[p', g, k] can be greater than 0 in the continuous mode. For example, the set of the cross-frequency number L[p', g, k] can be $$\begin{Bmatrix} L[p',1,3]\\ L[p',2,3]\\ L[p',3,3]\\ L[p',4,3]\\ L[p',5,3] \end{Bmatrix},$$

and in the meantime, the maximum of the cross-frequency number can be 3, the minimum of the cross-frequency number can be 1, the set p'{ } can be 0, 1, 3, 7, the parameter g can be 1-5, and the parameter k can be 1-3, but the present disclosure is not limited thereto.

In some embodiments, the processor 100 clears the set p" { } and clears the cross-frequency number L[p', g, k]. For example, the set p" { } can be the set of all of the sets p'{ } and is mainly configured to collect all of the possible sets p'{ }, but the present disclosure is not limited thereto.

In some embodiments, the processor 100 includes the sets p'{ } in the set p" { } to obtain the resultant set p" { } (i.e., the set p_final) when the processor 100 determines that the difference between the maximum of the cross-frequency number (such as the maximum Max{L[1, g, k]}) and the minimum of the cross-frequency number (such as the minimum Min{L[1, g, k]}) is less than the cross-frequency threshold value (such as the parameter q), but the present disclosure is not limited thereto.

In some embodiments, the set p" { } can be p'{ } which meets Equation 2, in the signal mode but the present disclosure is not limited thereto. In some embodiments, the set p" { } can be multiple sets p'{ } which meet Equation 2 in the continuous mode, but the present disclosure is not limited thereto.

In some embodiments, the associated operation and the design logic of the light emitting signals EM, EM[1], EM[2], EM[3], EM[4] and EM[5] in FIG. 5B are similar to that of the light emitting signals EM, EM[1] and EM[n] in FIG. 4A and FIG. 4B, but the present disclosure is not limited thereto.

Figure 5C:
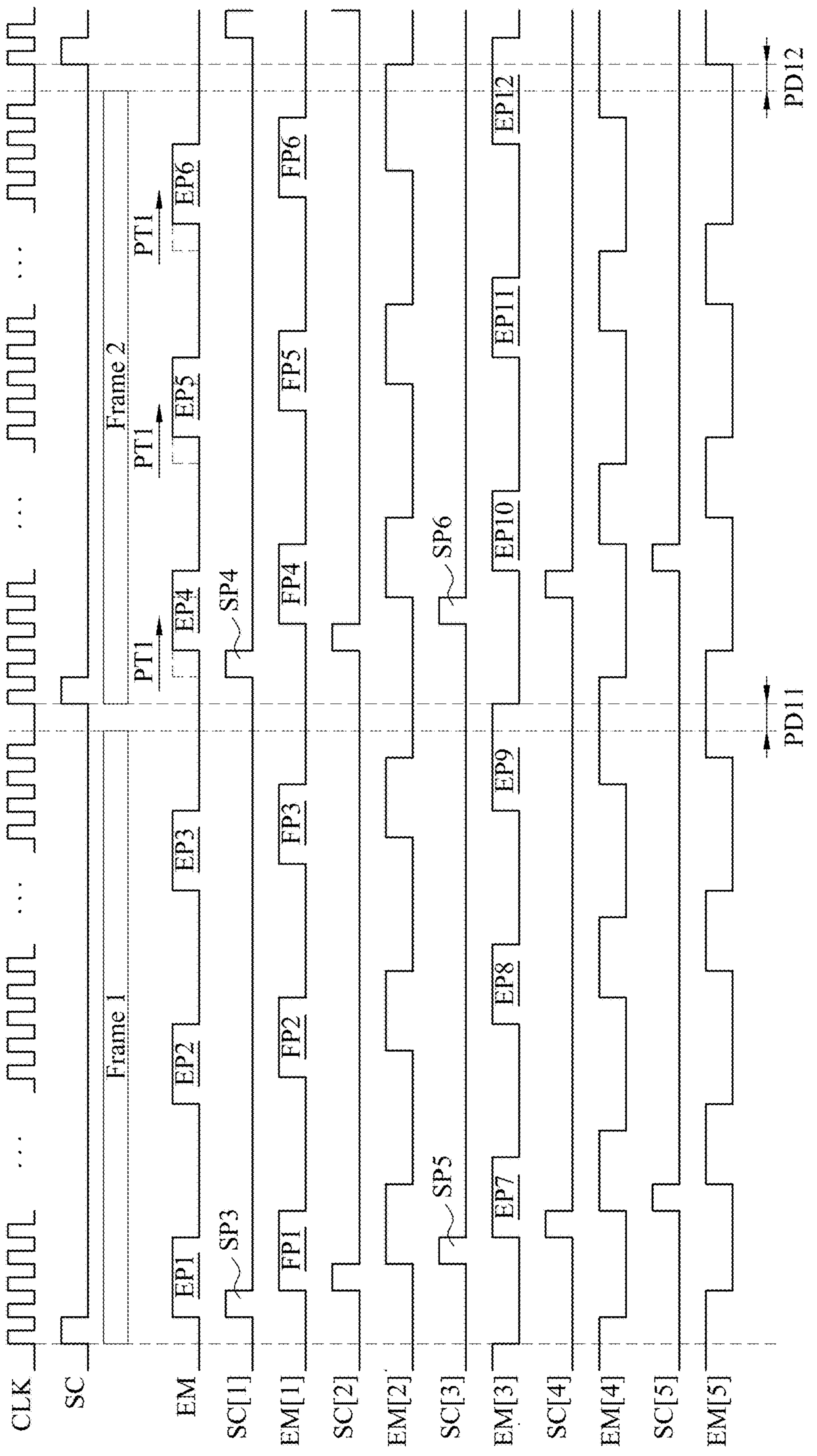
FIG. 5C illustrates a time sequence diagram of multiple signals of a panel driving device according to one embodiment of the present disclosure.

FIG. 5C illustrates a time sequence diagram of multiple signals of a panel driving device according to one embodiment of the present disclosure. As shown in FIG. 5C, in some embodiments, FIG. 5C has the first frame Frame 1 and the second frame Frame 2, and the cross-frequency period PD11 is provided between the first frame Frame 1 and the second frame Frame 2.

In some embodiments, the multiple signals in the first frame Frame 1 and the second frame Frame 2 in FIG. 5C (such as the clock signal CLK, the scan signal SC and the light emitting signal EM, and EM[1]-EM[5]) can correspond to the multiple signals in the first frame Frame 1 and the second frame Frame 2 in FIG. 5A, but the present disclosure is not limited thereto.

In some embodiments, FIG. 5C is similar to FIG. 5A. However, the difference between them is that the scan signals SC, SC[1], SC[2], SC[3], SC[4] and SC[5] are added to FIG. 5C in comparison with FIG. 5A, but the present disclosure is not limited thereto. In some embodiments, the associated operation and the design logic of the scan signals SC, SC[1], SC[2], SC[3], SC[4] and SC[5] in FIG. 5C are similar to the scan signals SC, SC[1] and SC[n] in FIG. 3, but the present disclosure is not limited thereto.

In some embodiments, in the first frame Frame 1 (or at the same time), the light emitting pulse signals FP1, FP2 and FP3 of the light emitting signal EM[1] can be beyond overlapping the scan pulse signal SP3 of the scan signal SC[1]. For example, the pulse starting point of the light emitting pulse signal FP1 of the light emitting signal EM[1] (i.e., where the rise signal is located) can be aligned to the pulse end point of the scan pulse signal SP3 of the scan signal SC[1](i.e., where the fall signal is located) and similarly, the pulse starting point of the light emitting pulse signal FP1 of the light emitting signal EM[1] can be separated from the pulse end point of the scan pulse signal SP3 of the scan signal SC[1], but the present disclosure is not limited thereto.

In some embodiments, when the parameter k is 1 to 3, the light emitting signal EM[1] can have multiple light emitting pulse signals, such as the light emitting pulse signal FP1 (the parameter k is 1, and the parameter g is 1), the light emitting pulse signal FP2 (the parameter k is 2, and the parameter g is 1) and the light emitting pulse signal EP3 (the parameter k is 3, and the parmeter g is 1), but the present disclosure is not limited thereto.

In some embodiments, in the first frame Frame 1 (or at the same time), the light emitting pulse signals FP7, FP8 and FP9 of the light emitting signal EM[3] can be beyond overlapping the scan pulse signal SP5 of the scan signal SC[3]. For example, the pulse starting point of the light emitting pulse signal FP7 of the light emitting signal EM[3] (i.e., where the rise signal is located) can be aligned to the pulse end point of the scan pulse signal SP5 of the scan signal SC[3](i.e., where the fall signal is located) and similarly, the pulse starting point of the light emitting pulse signal FP7 of the light emitting signal EM[3] can be separated from the pulse end point of the scan pulse signal SP5 of the scan signal SC[3], but the present disclosure is not limited thereto.

Figure 5D:
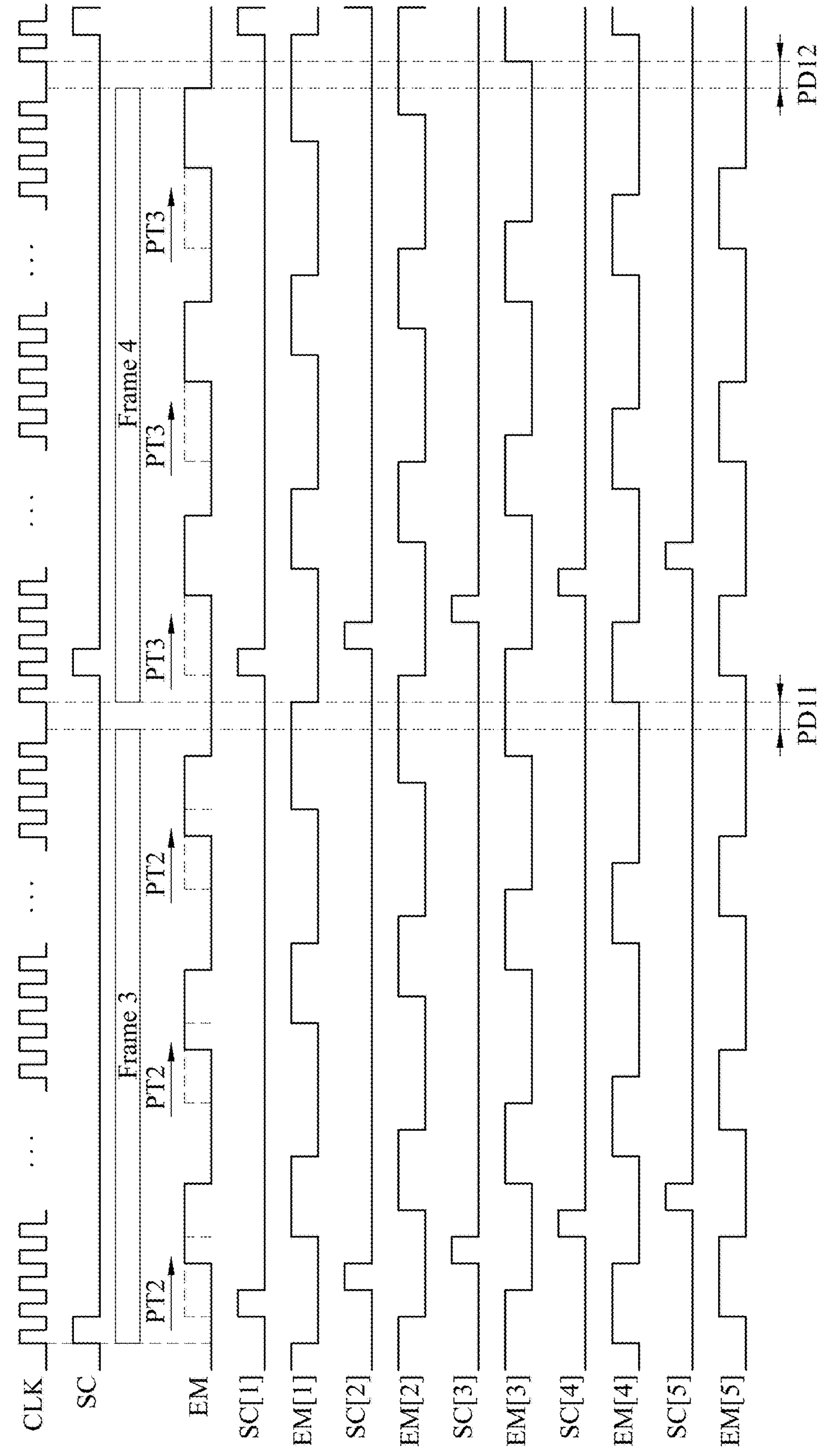
FIG. 5D illustrates a time sequence diagram of multiple signals of a panel driving device according to one embodiment of the present disclosure.

FIG. 5D illustrates a time sequence diagram of multiple signals of a panel driving device according to one embodiment of the present disclosure. As shown in FIG. 5D, in some embodiments, FIG. 5D is provided with the third frame Frame 3 and the fourth frame Frame 4, and the cross-frequency period PD11 is provided between the third frame Frame 3 and the fourth frame Frame 4.

In some embodiments, the multiple signals in the third frame Frame 3 and the fourth frame Frame 4 in FIG. 5D (such as the clock signal CLK, the scan signal SC and the light emitting signal EM, and EM[1]-EM[5]) can correspond to the multiple signals in the third frame Frame 3 and the fourth frame Frame 4 in FIG. 5B, but the present disclosure is not limited thereto.

In some embodiments, FIG. 5D is similar to FIG. 5B. However, the difference between them is that the scan signal SC, SC[1], SC[2], SC[3], SC[4] and SC[5] are added to FIG. 5D in comparison with FIG. 5B, but the present disclosure is not limited thereto. In some embodiments, the associated operation and the design logic of the scan signals SC, SC[1], SC[2], SC[3], SC[4] and SC[5] in FIG. 5D are similar to the scan signals SC, SC[1] and SC[n] in FIG. 3, but the present disclosure is not limited thereto.

Figure 6:
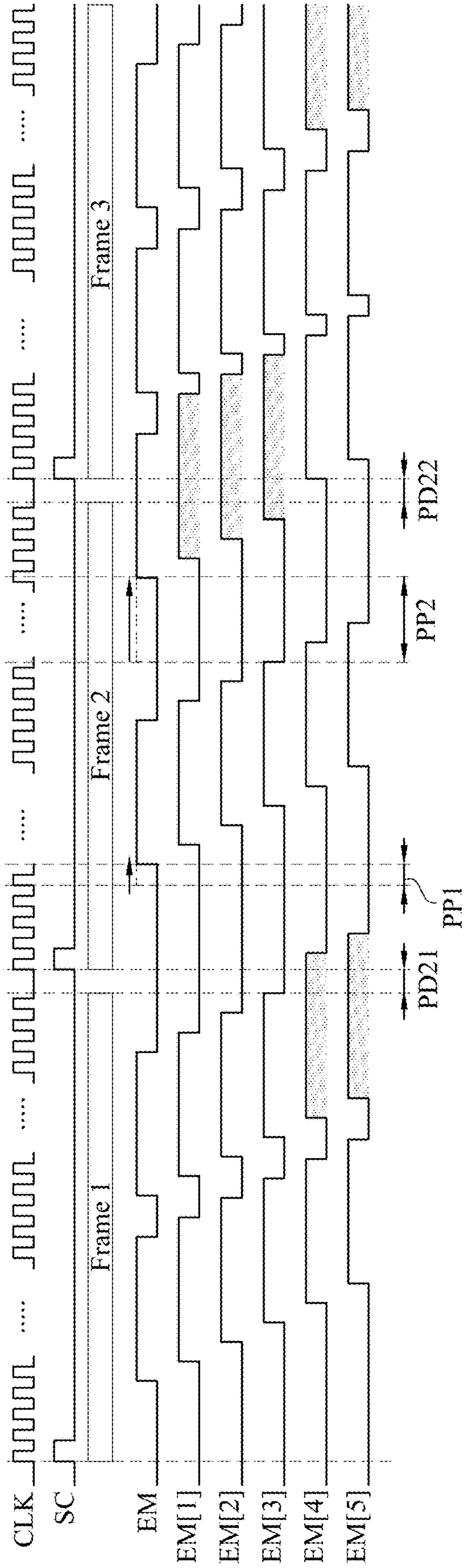
FIG. 6 illustrates a time sequence diagram of multiple signals of a panel driving device according to one embodiment of the present disclosure.

FIG. 6 illustrates a time sequence diagram of multiple signals of a panel driving device according to one embodiment of the present disclosure. As shown in FIG. 6, FIG. 6 is provided with the first frame Frame 1, the second frame Frame 2, and the third frame Frame 3, and the cross-frequency period PD21 is provided between the first frame Frame 1 and the second frame Frame 2 and the cross-frequency period PD22 is provided between the second frame Frame 2 and the third frame Frame 3.

In some embodiments, the illumination position of the light emitting signals EM, EM[1], EM[2], EM[3], EM[4] and EM[5] can be arbitrarily adjusted.

For example, in the second frame Frame 2, the processor 100 can shift the first pulse signal of the light emitting signal EM by the offset time PP1 to form the first offset pulse signal, the processor 100 can shift the second pulse signal of the light emitting signal EM by the offset time PP2 to form the second offset pulse signal, but the present disclosure is not limited thereto.

In some embodiments, the processor 100 (as shown in FIG. 1) can adjust time sequence (or referred to as the position of the pulse signal) according to the corss-frequency numbers, to cause the difference of cross-frequency numbers to reach the demand value. For example, the demand value can be the parameter q mentioned above, but the present disclosure is not limited thereto.

In some embodiments, the panel driving device 100 of the present disclosure can achieve the effect of panel brightness uniformization by controlling the offset time between the scan signals and the light emitting signals in different frames and overlapping multiple light emitting signals in different frames with cross-frequency period.

For example, under current technology, in the first frame, the second frame to the Nth frame, the pulse period of the pulse signals of the emitting light signals EM[1] and EM[2] keeps overlapping the cross-frequency period, and the pulse period of the pulse signals of the light emitting signals keeps beyond overlapping the cross-frequency period, which causes the circuit receiving the light emitting signals EM[1]

and EM[2] in the panel to keep generating the visual integral brightness difference such as bright lines or dark lines, and so on. However, as far as the present disclosure is concerned, in the first frame, the pulse periods of the pulse signals of the light-emitting signals EM, EM[1] and EM[2] can overlap the cross-frequency period, and the pulse periods of the pulse signals of the light-emitting signals EM[3], EM[4] and EM[5] can be beyond overlapping the cross-frequency period, while in the second frame, the pulse periods of the pulse signals of the light-emitting signals EM[2] and EM[3] can overlap the cross-frequency period, and the pulse periods of the pulse signals of the light-emitting signals EM[1], EM[4] and EM[5] can be beyond overlapping the cross-frequency period.

In short, the skills in the present disclosure can cause the pulse period of the pulse signals of different light emitting signals to overlap the cross-frequency period, i.e., achieve the effect of panel brightness uniformization.

In some embodiments, please refer to FIGS. 2A to 2D, FIG. 3, FIG. 4A to FIG. 4B, FIG. 5A to FIG. 5D and FIG. 6 together. The multiple signals received in the hardware in FIGS. 2A to 2D of the present disclosure each can correspond to the multiple signals in FIG. 3, FIG. 4A to FIG. 4B, FIG. 5A to FIG. 5D and FIG. 6, but the present disclosure is not limited thereto.

Figure 7:
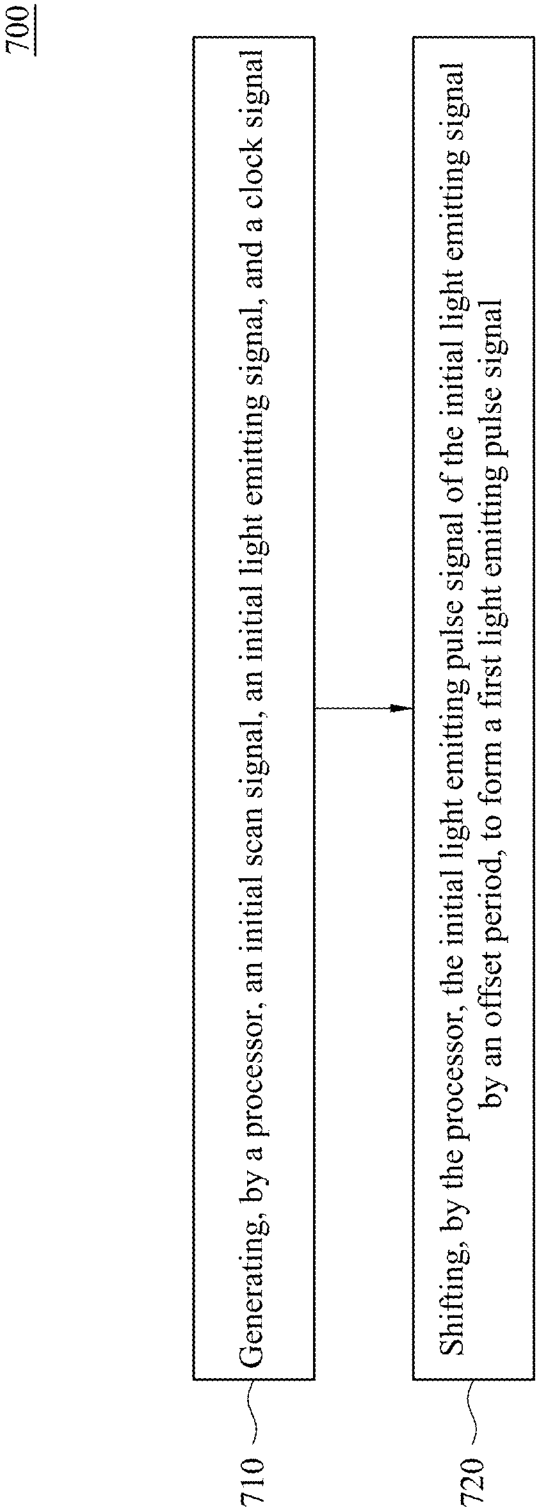
FIG. 7 illustrates a step flow diagram of a panel driving method according to one embodiment of the present disclosure.

FIG. 7 illustrates a step flow diagram of a panel driving method according to one embodiment of the present disclosure. As shown in FIG. 7, the panel driving method 700 includes the step 710 and the step 720. The steps of the panel driving method 700 will be detailed as follows.

In the step 710, the processor generates an initial scan signal, an initial light emitting signal and the clock signal.

In some embodiments, please refer to FIG. 1, FIG. 5A and FIG. 7 together. The processor 100 generates the initial scan signal SC, the initial light emitting signal EM and the clock signal CLK. In the first frame Frame 1, the initial scan signal SC has the initial scan pulse signal SP1. In the second frame Frame 2, the initial scan signal SC has the initial scan pulse signal SP2, and the second frame Frame 2 is located after the first frame Frame 1. In the first frame Frame 1, the initial light emitting signal EM has the initial light emitting pulse signal EP1, and the pulse time PS2 of the initial light emitting pulse signal EP1 does not overlap the pulse time PS1 of the initial scan signal SC. For example, the operations of the panel driving method 700 are similar to the operations of the panel driving device 100 in FIG. 5A. For the sake of conciseness, the description for other operations regarding the panel driving method will be omitted herein.

In the step 720, the processor shifts the initial light emitting pulse signal of the initial light emitting signal by an offset period, to form a first light emitting pulse signal.

In some embodiments, please refer to FIG. 1, FIG. 5A and FIG. 7 together. In the second frame Frame 2, the processor 100 shifts the initial light emitting pulse signal EP1 of the initial light emitting signal EM by the offset period PT1, to form the first light emitting pulse signal EP4, and the offset period PT1 is associate with the frame number. For example, the operations of the panel driving method 700 are similar to the operations of the panel driving device 100 in FIG. 5A. For the sake of conciseness, the description of other operations regarding the panel driving method 700 will be omitted herein.

In some embodiments, the panel driving method 700 further includes the steps of: outputting, by the processor, the second light emitting signal according to the initial scan signal and the initial light emitting signal.

In some embodiments, please refer to FIG. 1, FIG. 5A and FIG. 7. The processor 100 outputs the second light emitting signal EM[3] according to the initial scan signal SC and the initial light-emitting signal EM. In the first frame Frame 1, the second light emitting signal EM[3] has the second light emitting pulse signal EP7. The second light emitting pulse signal EP7 of the second light emitting signal EM[3] is far away from the initial light emitting signal EP1 of the initial light emitting signal EM. For example, the operations of the panel driving method 700 are similar to the operations of the panel driving device 100 in FIG. 5A. For the sake of conciseness, the description for other operations regarding the panel driving method will be omitted herein.

In some embodiments, the pulse periods of the initial light emitting pulse signals EP1, EP2 or EP3 does not overlap the first cross-frequency period of the processor 100. The pulse period of the second light emitting pulse signal overlaps the first cross-frequency period PD1 of the processor, and the first cross-frequency period PD1 is associated with the clock signal CLK.

For example, the operations of the panel driving method 700 are similar to the operations of the panel driving device 100 in FIG. 5A. For the sake of conciseness, the description for other operations regarding the panel driving method 700 will be omitted herein.

In some embodiments, the panel driving method 700 further includes the step of: in the first frame Frame 1, setting, by the processor, the maximum of the cross-frequency number and the minimum of the cross-frequency number, according to the signal cross-frequency relation between signals during the first cross-frequency period. For example, the operations of the panel driving method 700 are similar to the operations of the panel driving device 100 in FIG. 5A. For the sake of conciseness, the description for other operations regarding the panel driving method will be omitted herein.

In some embodiments, the panel driving method 700 further includes the step of: setting, by the processor 100, the cross-frequency threshold value such as the parameter q. For example, the operations of the panel driving method 700 are similar to the operations of the panel driving device 100 in FIG. 5A. For the sake of conciseness, the description for other operations regarding the panel driving method 700 will be omitted herein.

In some embodiments, the panel driving method 700 further includes the step of: determining, by the processor 100, whether the difference between the maximum of the cross-frequency number (such as Max{L[1, g, k]}) and the minimum of the cross-frequency number (such as Min{L[1, g, k]}) is less than the cross-frequency threshold value (such as q) or not. For example, the operations of the panel driving method 700 are similar to the operations of the panel driving device 100 in FIG. 5A. For the sake of conciseness, the description for other operations regarding the panel driving method will be omitted herein.

Figure 8:
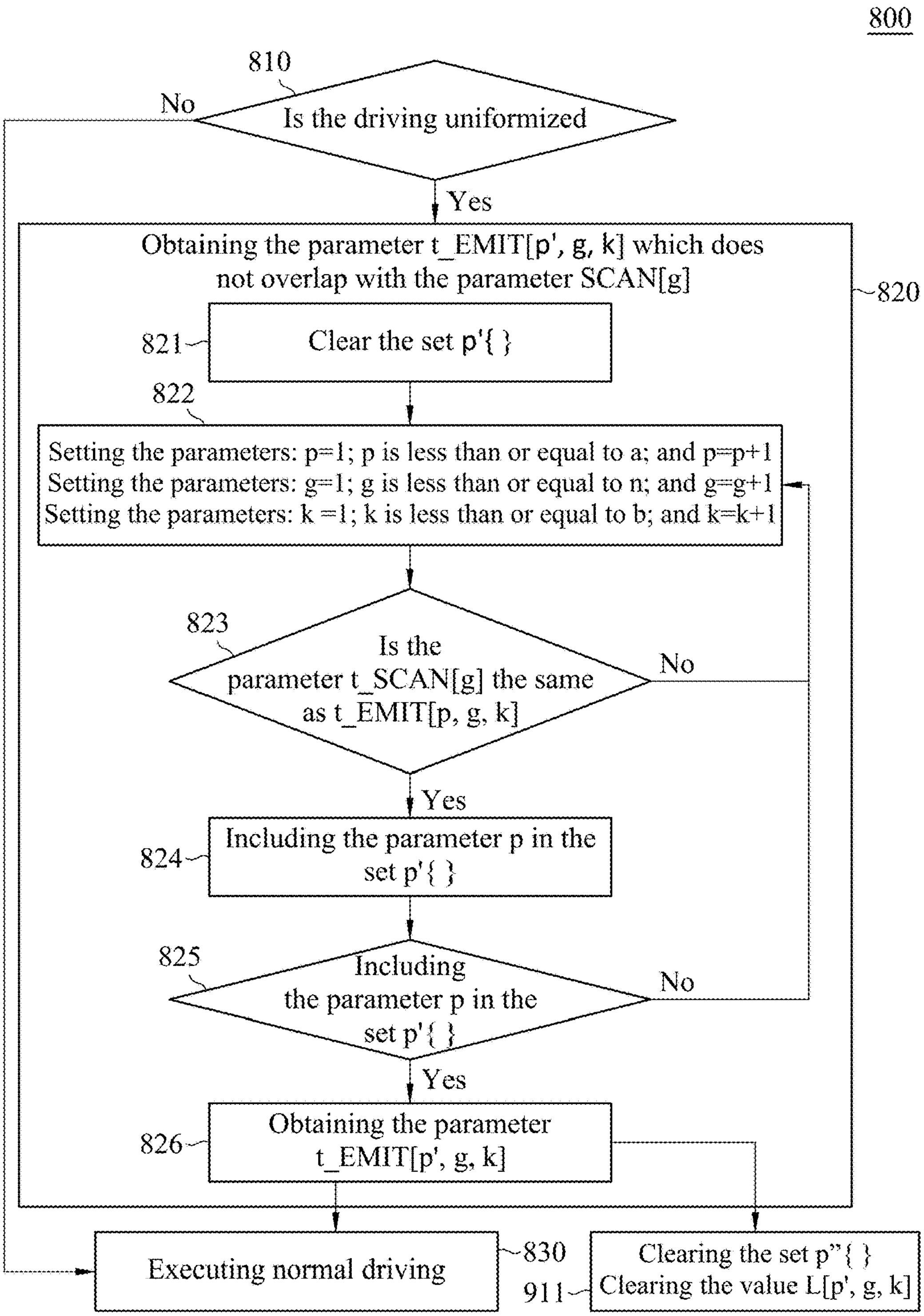
FIG. 8 illustrates a step flow diagram of a panel driving method according to one embodiment of the present disclosure.

FIG. 8 illustrates a step flow diagram of a panel driving method according to one embodiment of the present disclosure. As shown in FIG. 8, the panel driving method includes the step 810, the step 820, the step 830 and the step 911. For ease of understanding of the panel driving method in FIG. 8, please refer to FIG. 1, FIG. 5A, FIG. 7 and FIG. 8. The steps of panel driving method 800 will be detailed as follows.

In the step 810, whether the uniformization is driven or not is determined. In some embodiments, the processor 100 can determine whether the uniformization driving is executed or not.

In the step 820, the parameter t_EMIT[p', g, k] which does not overlap the parameter t_SCAN[g] is obtained. In some embodiments, the processor 100 can obtain the parameter t_EMIT[p', g, k] which does not overlap the parameter t_SCAN[g].

In the step 821, the set p'{ } is cleared. In some embodiments, the processor 100 can clear the set p'{ }.

In the step 822, the parameter settings: p=1; p p≤a; and p=p+1, the parameters settings: g=1; g≤n; and g=g+1, and the parameter settings: k=1; k≤b; and k=k+1 are executed. In some embodiments, the processor 100 can execute the parameter settings: p=1; p p≤a; and p=p+1. In some embodiments, the processor 100 can execute the parameter settings: g=1; g≤n; and g=g+1. In some embodiments, the processor 100 can execute the parameter settings: k=1; k≤b; and k=k+1.

In the step 823, whether the parameter t_SCAN[g] is the same as t_EMIT[p, g, k] is determined or not. In some embodiments, the processor 100 can determine whether the parameter t_SCAN[g] is the same as t_EMIT[p, g, k] is determined or not.

In the step 824, the parameter p is included in the set p'{ }. In some embodiments, the processor 100 can include the parameter p in the set p'{ }.

In the step 825, whether all conditions are completed or not is verified. In some embodiments, the processor 100 can determine (or verify) whether all conditions are completed or not. For example, all conditions can be the parameters and the associated settings mentioned in the step 821 to the step 824, but the present disclosure is not limited thereto.

In the step 826, the parameter t_EMIT[p', g, k] is obtained. In some embodiments, the prcocessor 100 can obtain the parameter t_EMIT[p', g, k].

In the step 830, normal driving is executed. In some embodiments, the processor 100 can execute normal driving.

In the step 911, the set p" { } is cleared, and the value L[p', g, k] is cleared. In some embodiments, the processor 100 can clear the set p" { }. In some embodiments, the processor 100 can clear the value L[p', g, k].

In some embodiments, please refer to FIG. 7 and FIG. 8 together. The panel driving method 700 includes the panel driving method 800, but the present disclosure is not limited thereto.

In some embodiments, the panel driving method 800 can correspond to the operations in FIG. 4A and FIG. 4B, but the present disclosure is not limited thereto.

In some embodiments, the multiple signals in FIG. 4A, such as the light emitting signals EM, EM[1], and EM[n], can form the multiple signals in FIG. 4B through the panel driving method, but the present disclosure is not limited thereto.

Figure 9:
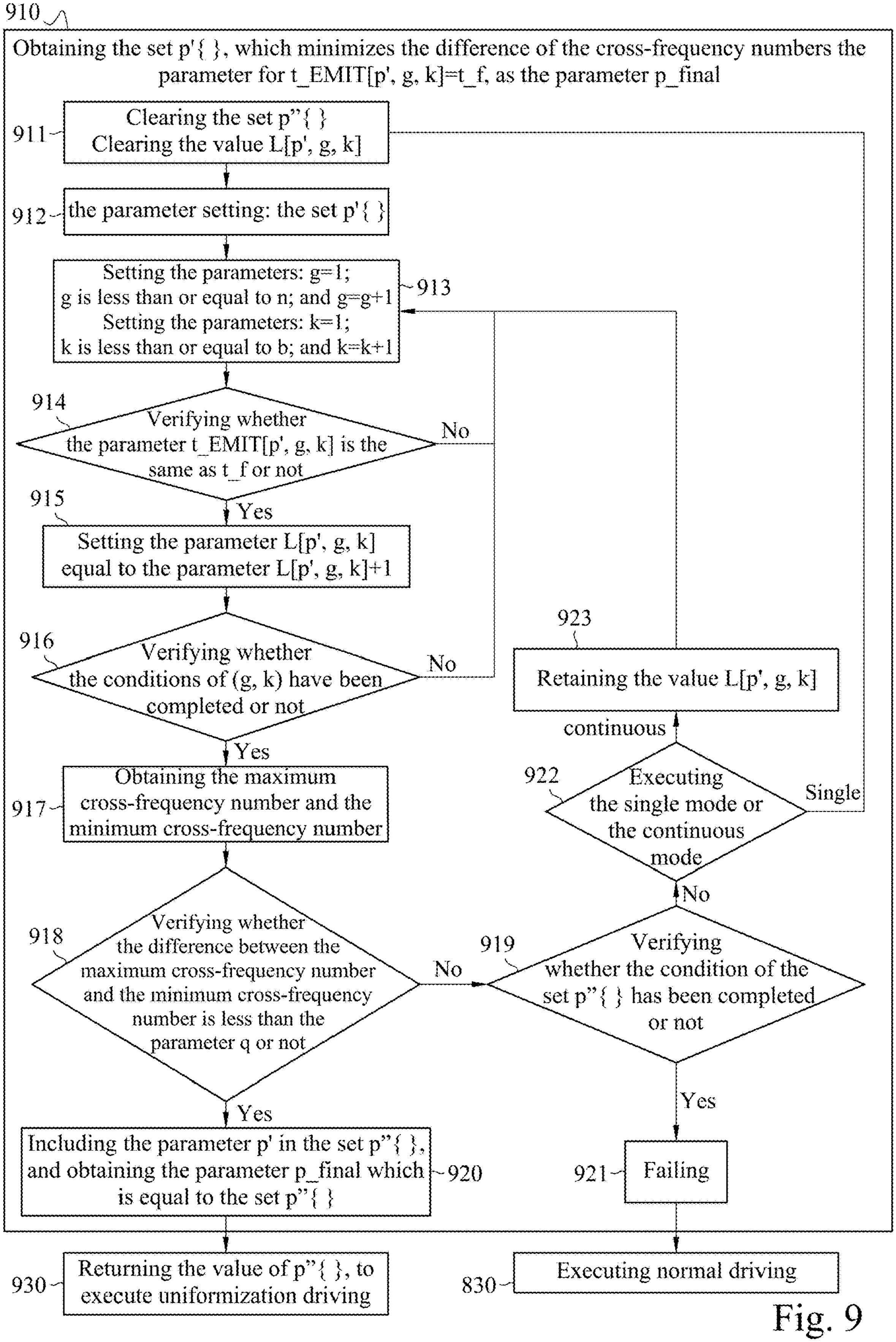
FIG. 9 illustrates a step flow diagram of a panel driving method according to one embodiment of the present disclosure.

FIG. 9 illustrates a step flow diagram of a panel driving method according to one embodiment of the present disclosure. Continued from FIG. 8, as shown in FIG. 9, the panel driving method 800 further include the step 910 and the step 930, and the step 911 can be included in the step 910. For ease of understanding of the panel driving method, please refer to FIG. 1, FIG. 5A, FIG. 8 and FIG. 9 together. The steps of the panel driving method 800 are detailed as follows.

In the step 910, the set p'{ }, which minimizes the difference of the cross-frequency numbers the parameter for t_EMIT[p', g, k]=t_f, is obtained as the parameter p_final. In some embodiments, the processor 100 can obtain the set p'{ }, which minimizes the difference of the cross-frequency numbers the parameter for t_EMIT[p', g, k]=t_f, as the parameter p_final. For example, the cross-frequency number L can be L[p', g, k], but the present disclosure is not limited thereto.

In the step 911, the set p" { } is cleared, and the value L[p', g, k] is cleared. In some embodiments, the processor 100 can clear the set p" { }. In some embodiments, the processor 100 can clear the value L[p', g, k].

In the step 912, the parameter setting: the set p'{ } is executed. In some embodiments, the processor 100 can execute the parameter setting: the set p'{ }.

In the step 913, the parameter settings: g=1; g≤n; g=g+1, and the parameter settings: k=1; k≤b; k=k+1 are executed. In some embodiments, the processor 100 can execute the parameter settings: g=1; g≤n; g=g+1. In some embodiments, the processor 100 can execute the parameter settings: k=1; k≤b; k=k+1.

In the step 914, whether the parameter t_EMIT[p', g, k] is the same as the parameter t_f or not is verified. In some embodiments, the processor 100 can determine (or verify) whether the parameter t_EMIT[p', g, k] is the same as the parameter t_f or not.

In the step 915, the parameter L[p', g, k] is set equal to the parameter L[p', g, k]+1. In some embodiments, the processor 100 can set the parameter L[p', g, k] equal to the parameter L[p', g, k]+1.

In the step 916, whether the condition of (g, k) has been completed or not is verified. In some embodiments, the processor can determine (or verify) whether the condition of (g, k) has been completed or not.

In the step 917, the maximum cross-frequency number and the minimum cross-frequency number are obtained. In some embodiments, the processor 100 can obtain the maximum cross-frequency number Max{L[p', g, k]} and the minimum cross-frequency number Min{L[p', g, k]}.

In the step 918, whether the difference between the maximum cross-frequency number and the minimum cross-frequency number is less than the parameter q or not is verified. In some embodiments, the processor 100 can determine (or verify) whether the difference between the maximum cross-frequency number Max{L[p', g, k]} and the minimum cross-frequency number Min{L[p', g, k]} is less than the parameter q or not.

In the step 919, whether the condition of the set p" { } has been completed or not is verified. In some embodiments, the processor 100 can determine (or verify) whether the condition of the set p" { } has been completed or not.

In the step 920, the parameter p' is included in the set p" { }, and the parameter p_final which is equal to the set p" { } is obtained. In some embodiments, the processor 100 can include the parameter p' in the set p" { }. In some embodiments, the processor 100 can obtain the parameter p_final which is equal to the set p" { }.

In the step 921, failing is determined. In some embodiments, the processor can determine failing.

In the step 830, normal driving is executed. In some embodiments, the processor can execute normal driving.

In the step 922, the single mode or the continuous mode is executed. In some embodiments, the processor can determine to execute the single mode or the continuous mode.

In the step 923, the value L[p', g, k] is retained. In some embodiments, the processor can retain the value L[p', g, k].

In the step 930, the value of p" { } is returned to execute uniformization driving. In some embodiments, the processor 100 can return the value of p" { }.

In some embodiments, the processor 100 can execute uniformization driving.

In some embodiments, the multiple steps in the step 910 in FIG. 9 can correspond to the operations and the associated description of Equation 1 and Equation 2, but the present disclosure is not limited thereto.

In some embodiments, the processor 100 executes the multiple steps in FIG. 8 and FIG. 9 without a specific order, and can execute the multiple steps in the order that is arbitrarily adjusted according to user needs, but the present disclosure is not limited thereto.

In some embodiments, the following effects can be provided according to the panel driving device 100 of the present disclosure, in combination with the techniques and operations mentioned above.

The effect with no need to revise the panel design and to revise the gate on array (GOA) circuit, can be achieved through the operations of the panel driving device 100 of the present disclosure.

The effect of increasing the production line efficiency without implementing complicated procedure of defect Correction (DeMura) can be achieved through the operations of the panel driving device 100 of the present disclosure.

The effect of automatic computation in chips or integrated circuits (IC) without the aid of an external apparatus, such as a defect-correction (DeMura) camera, can be achieved though the operations of the panel driving device 100 of the present disclosure.

The effect of embedding the algorithm into the existing timing controllers (TCONs) or application specific integrated circuits (ASICs) and low cost, can be achieved through the operations of the panel driving device 100 of the present disclosure.

The effect of high sharability provided without need to adjust each of the panels, can be achieved through the operations of the panel driving device 100 of the present disclosure. As long as multi-emission driving or light emitting time suffers frequency crossover, the similar problems will happen. The techniques and operations can solve all of the similar problems.

It can be seen from the above embodiments of the present disclosure that the application of the present disclosure has the following advantages. The panel driving device as shown in the embodiments of the present disclosure can achieve the effect of panel brightness uniformization by adjustment between scan signals.

Although the present disclosure has been described in considerable detail with reference to certain embodiments thereof, but this does not intend to limit the present disclosure. It will be apparent to those skilled in the art that various modifications and variations can be made to the structure of the present application without departing from the scope or spirit of the disclosure. Therefore, what the present application covers shall depend on the scope defined by the following claims.

What is claimed is:

1. A panel driving device, comprising:

a processor configured to generate an initial scan signal, an initial light emitting signal, and a clock signal, wherein the initial scan signal has an initial scan pulse signal in a first frame, wherein the initial scan signal has the initial scan pulse signal in a second frame, and the second frame is located after the first frame, wherein the initial light emitting signal has an initial light emitting pulse signal in the first frame, wherein the processor shifts the initial light emitting pulse signal of the initial light emitting by an offset period to form a first light emitting pulse signal, and the offset period is associated with a frame number.

2. The panel driving device of claim 1, wherein the processor outputs a second light emitting signal according to the initial scan signal and the initial light emitting signal, wherein the second light emitting pulse has a second light emitting pulse signal in the first frame.

3. The panel driving device of claim 2, wherein the second light emitting pulse signal of the second light emitting signal is far away from the initial light emitting pulse signal of the initial light emitting signal.

4. The panel driving device of claim 2, wherein the processor outputs a first scan signal according to the initial scan signal.

5. The panel driving device of claim 4, wherein the first scan signal has a first scan pulse signal in the first frame, and the second light emitting pulse signal of the second light emitting signal does not overlap the first scan pulse signal of the first scan signal.

6. The panel driving device of claim 2, wherein a pulse period of the initial light emitting pulse signal does not overlap a first cross-frequency period of the processor, and first cross-frequency period is associated with the clock signal.

7. The panel driving device of claim 2, wherein a pulse period of the second light emitting pulse signal overlaps a first cross-frequency period of the processor, and the first cross-frequency period is associated with the clock signal.

8. The panel driving device of claim 2, wherein a pulse period of the initial light emitting pulse signal does not overlap a first cross-frequency period of the processor, wherein a pulse period of the second light emitting pulse signal overlaps a first cross-frequency period of the processor.

9. The panel driving device of claim 8, wherein the first cross-frequency period is associated with the clock signal.

10. The panel driving device of claim 2, wherein when in the first frame, the processor sets a maximum of a cross-frequency number and a minimum of the cross-frequency number according to a signal cross-frequency relation of a first cross-frequency period.

11. The panel driving device of claim 10, wherein the processor further sets a cross-frequency threshold value, and the processor determines whether a difference between the maximum of the cross-frequency number and the minimum of the cross-frequency number is less than the cross-frequency threshold value.

12. A panel driving method, comprising:

generating, by a processor, an initial scan signal, an initial light emitting signal, and a clock signal, wherein the initial scan signal has an initial scan pulse signal in a first frame, wherein the initial scan signal has the initial scan pulse signal in a second frame, and the second frame is located after the first frame, wherein the initial light emitting signal has an initial light emitting pulse signal in the first frame, and shifting, by the processor, the initial light emitting pulse signal of the initial light emitting signal by an offset period, to form a first light emitting pulse signal, and the offset period is associated with a frame number.

13. The panel driving method of claim 12, further comprising:

outputting, by the processor, a second light emitting signal, according to the initial scan signal and the initial light emitting signal.

14. The panel driving method of claim 13, wherein the second light emitting signal has a second light emitting pulse in the first frame, wherein the second light emitting pulse signal of the second light emitting signal is far away from the initial light emitting pulse signal of the initial light emitting signal.

15. The panel driving method of claim 14, further comprising:

outputting, by the processor, a first scan signal, according to the initial scan signal.

16. The panel driving method of claim 15, wherein the first scan signal has a first scan pulse signal, and the second light emitting pulse signal of the second light emitting signal does not overlap the first scan pulse signal of the first scan signal.

17. The panel driving method of claim 14, wherein a pulse period of the initial light emitting pulse signal does not overlap a first cross-frequency period of the processor.

18. The panel driving method of claim 17, wherein a pulse period of the second light emitting pulse signal overlaps a first cross-frequency period of the processor.

19. The panel driving method of claim 14, further comprising:

setting, by the processor, a maximum of a cross-frequency number and a minimum of the cross-frequency number, according to a signal cross-frequency relation, when in the first frame.

20. The panel driving method of claim 19, further comprising:

setting a cross-frequency threshold value by the processor; and determining whether a difference between the maximum of the cross-frequency number and the minimum of the cross-frequency number are less than the cross-frequency threshold value.

* * * * *